US012124344B2

(12) United States Patent
Dye et al.

(10) Patent No.: US 12,124,344 B2
(45) Date of Patent: *Oct. 22, 2024

(54) SYSTEMS AND METHODS FOR ENABLING A HIGHLY AVAILABLE MANAGED FAILOVER SERVICE

(71) Applicant: Amazon Technologies, Inc., Seattle, WA (US)

(72) Inventors: Nathan Dye, Seattle, WA (US); Harvo Reyzell Jones, Lake Forest Park, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/321,397

(22) Filed: May 22, 2023

(65) Prior Publication Data

US 2023/0305935 A1     Sep. 28, 2023

Related U.S. Application Data

(63) Continuation of application No. 17/862,046, filed on Jul. 11, 2022, now Pat. No. 11,693,746, which is a
(Continued)

(51) Int. Cl.
    *G06F 11/20*     (2006.01)
    *G06F 9/445*     (2018.01)
    (Continued)

(52) U.S. Cl.
    CPC ...... *G06F 11/2023* (2013.01); *G06F 9/44505* (2013.01); *G06F 11/3006* (2013.01);
(Continued)

(58) Field of Classification Search
    CPC ............. G06F 11/2023; G06F 11/3006; G06F 9/44505; H04L 47/2475; H04L 47/125; H04L 67/10
(Continued)

(56) References Cited

U.S. PATENT DOCUMENTS

| 6,865,591 | B1 | 3/2005 | Garg |
| 8,595,547 | B1 * | 11/2013 | Sivasubramanian ........................ G06F 11/2056 714/11 |

(Continued)

FOREIGN PATENT DOCUMENTS

| CN | 105144138 | 12/2015 |
| CN | 110297801 | 10/2019 |

(Continued)

OTHER PUBLICATIONS

Search Report and Written Opinion dated Jul. 16, 2021, issued in PCT/US2021/024173.
(Continued)

*Primary Examiner* — Ruolei Zong
(74) *Attorney, Agent, or Firm* — Knobbe, Martens, Olson & Bear, LLP

(57) ABSTRACT

A computing system that receives and stores configuration information for the application in a data store. The configuration information comprises (1) identifiers for a plurality of cells of the application that include at least a primary cell and a secondary cell, (2) a defined state for each of the plurality of cells, (3) one or more dependencies for the application, and (4) a failover workflow defining actions to take in a failover event. The computing system receives an indication, from a customer, of a change in state of the primary cell or a request to initiate the failover event. The computing system updates, in the data store, the states for corresponding cells of the plurality of cells based on the
(Continued)

failover workflow and updates, in the data store, the one or more dependencies for the application based on the failover workflow.

20 Claims, 9 Drawing Sheets

Related U.S. Application Data continuation of application No. 16/698,840, filed on Nov. 27, 2019, now Pat. No. 11,385,975.

(51) Int. Cl.
| | | |
|---|---|---|
| *G06F 11/30* | (2006.01) | |
| *H04L 12/803* | (2013.01) | |
| *H04L 12/859* | (2013.01) | |
| *H04L 29/08* | (2006.01) | |
| *H04L 47/125* | (2022.01) | |
| *H04L 47/2475* | (2022.01) | |
| *H04L 67/10* | (2022.01) | |

(52) U.S. Cl.
CPC ........ *H04L 47/125* (2013.01); *H04L 47/2475* (2013.01); *H04L 67/10* (2013.01)

(58) Field of Classification Search
USPC .......................................................... 709/220
See application file for complete search history.

(56) References Cited

U.S. PATENT DOCUMENTS

| | | | |
|---|---|---|---|
| 8,918,673 | B1 | 12/2014 | Rangaiah et al. |
| 9,116,862 | B1 | 8/2015 | Rath |
| 9,274,903 | B1 | 3/2016 | Garlapati |
| 9,984,140 | B1 | 5/2018 | Sukumaran |
| 10,404,613 | B1 | 9/2019 | Brooker |
| 10,713,129 | B1 | 7/2020 | Turmala |
| 11,341,005 | B2 | 5/2022 | Waters |
| 11,366,728 | B2 | 6/2022 | MacCarthaigh |
| 11,385,975 | B2 | 7/2022 | Dye |
| 11,397,651 | B2 | 7/2022 | Dye |
| 11,397,652 | B2 | 7/2022 | MacCarthaigh |
| 11,411,808 | B2 | 8/2022 | MacCarthaigh |
| 2005/0193227 | A1 | 9/2005 | Nakahara |
| 2005/0283658 | A1 | 12/2005 | Clark |
| 2006/0047776 | A1 | 3/2006 | Chieng |
| 2007/0006015 | A1* | 1/2007 | Rao ...................... G06F 11/1425 |
| | | | 714/E11.073 |
| 2007/0180314 | A1 | 8/2007 | Kawashima |
| 2008/0294933 | A1 | 11/2008 | Nishii |
| 2009/0228589 | A1 | 9/2009 | Korupolu |
| 2009/0290483 | A1 | 11/2009 | Curtis |
| 2010/0325473 | A1 | 12/2010 | Agneeswaran |
| 2011/0099146 | A1 | 4/2011 | McAlister |
| 2011/0145243 | A1 | 6/2011 | Yudenfriend |
| 2011/0239215 | A1 | 9/2011 | Sugai |
| 2014/0059379 | A1 | 2/2014 | Ren |
| 2014/0317441 | A1 | 10/2014 | Arata |
| 2015/0178137 | A1 | 6/2015 | Gordon |
| 2015/0370659 | A1 | 12/2015 | Pershin |
| 2016/0004552 | A1 | 1/2016 | Innan |
| 2017/0230451 | A1* | 8/2017 | Paramasivam ....... H04L 67/535 |
| 2017/0339065 | A1 | 11/2017 | Li |
| 2018/0004612 | A1 | 1/2018 | Gahlot |
| 2018/0143885 | A1* | 5/2018 | Dong ...................... G06F 9/547 |
| 2018/0165166 | A1 | 6/2018 | Wang |
| 2019/0235979 | A1 | 8/2019 | Li |
| 2019/0250849 | A1 | 8/2019 | Compton |
| 2019/0281014 | A1* | 9/2019 | Lin .......................... H04L 67/10 |
| 2019/0324874 | A1 | 10/2019 | Gill |
| 2020/0042410 | A1 | 2/2020 | Gupta |
| 2020/0044966 | A1 | 2/2020 | Krishnan |
| 2020/0104222 | A1 | 4/2020 | Ramamoorthi |
| 2020/0257704 | A1* | 8/2020 | Du .......................... G06F 9/544 |
| 2020/0285547 | A1 | 9/2020 | Shukla |
| 2020/0319890 | A1 | 10/2020 | Compton |
| 2021/0004275 | A1* | 1/2021 | Avagyan ............. G06F 9/45558 |
| 2021/0144050 | A1 | 5/2021 | Fagan |

FOREIGN PATENT DOCUMENTS

| | | |
|---|---|---|
| WO | WO 2021/108452 | 6/2021 |
| WO | WO 2021/195392 | 9/2021 |

OTHER PUBLICATIONS

Search Report and Written Opinion dated Jun. 1, 2021 issued in PCT/US2020/062090.

International Preliminary Report on Patentability dated Jun. 9, 2022, issued in PCT/US2020/062090.

Zhou et al., "Cloud Service Reliability Enhancement via Virtual Machine Placement Optimization", 2017, IEEE Transactions on Services Computing, pp. 902-913 (Year: 2017).

* cited by examiner

SYSTEMS AND METHODS FOR ENABLING A HIGHLY AVAILABLE MANAGED FAILOVER SERVICE

CROSS-REFERENCE TO RELATED APPLICATIONS

This application is a continuation of U.S. patent application Ser. No. 17/862,046, filed Jul. 11, 2022, which is a continuation of U.S. patent application Ser. No. 16/698,840, filed Nov. 27, 2019, now U.S. Pat. No. 11,385,975 titled "SYSTEMS AND METHODS FOR ENABLING A HIGHLY AVAILABLE MANAGED FAILOVER SERVICE," of which is hereby incorporated by reference in its entirety herein.

BACKGROUND

Cloud, or network-based, computing, in general, is an approach to providing access to information technology resources through services, such as Web services, where the hardware and/or software used to support those services is dynamically scalable to meet the needs of the services at any given time. In a network-based services, elasticity refers to network-delivered computing resources that can be scaled up and down by a service provider to adapt to changing requirements of users. For example, the elasticity of these resources can be in terms of processing power, storage, bandwidth, and so forth. Elastic computing resources may be delivered automatically and on-demand, dynamically adapting to the changes in resource requirements on or within a given user's system. For example, a user can use a cloud, or network-based, service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to the elastic resources accessed through the cloud or via a network, and thus does not have to purchase and maintain the hardware and/or software that provide access to these resources. This provides a number of benefits, including allowing users to quickly reconfigure their available computing resources in response to changing demands of their enterprise and enabling the cloud or network service provider to automatically scale provided computing service resources based on usage, traffic, or other operational requirements. This dynamic nature of cloud (for example, network-based) computing services, in contrast to a relatively static infrastructure of on-premises computing environments, requires a system architecture that can reliably re-allocate its hardware according to the changing needs of its user base and demands on the network-based services.

In elastic networking embodiments, locations in which applications may be hosted and/or partitioned may be described as regions and/or availability zones. Each region comprises a separate geographic area from other regions and includes multiple, isolated availability zones. Each region may be isolated from all other regions in the cloud or network-based computing system. An availability zone is an isolated location inside a region. Each region is made up of several availability zones that each belong to a single region. Also, each availability zone is isolated, but the availability zones in a particular region are connected through low-latency links. When an application is distributed across multiple availability zones, instances may be launched in different availability zones to enable your application to maintain operation if one of the instances fails (for example, by allowing another instance in another availability zone to handle requests for the application).

DETAILED DESCRIPTION

Introduction

Figure 1:
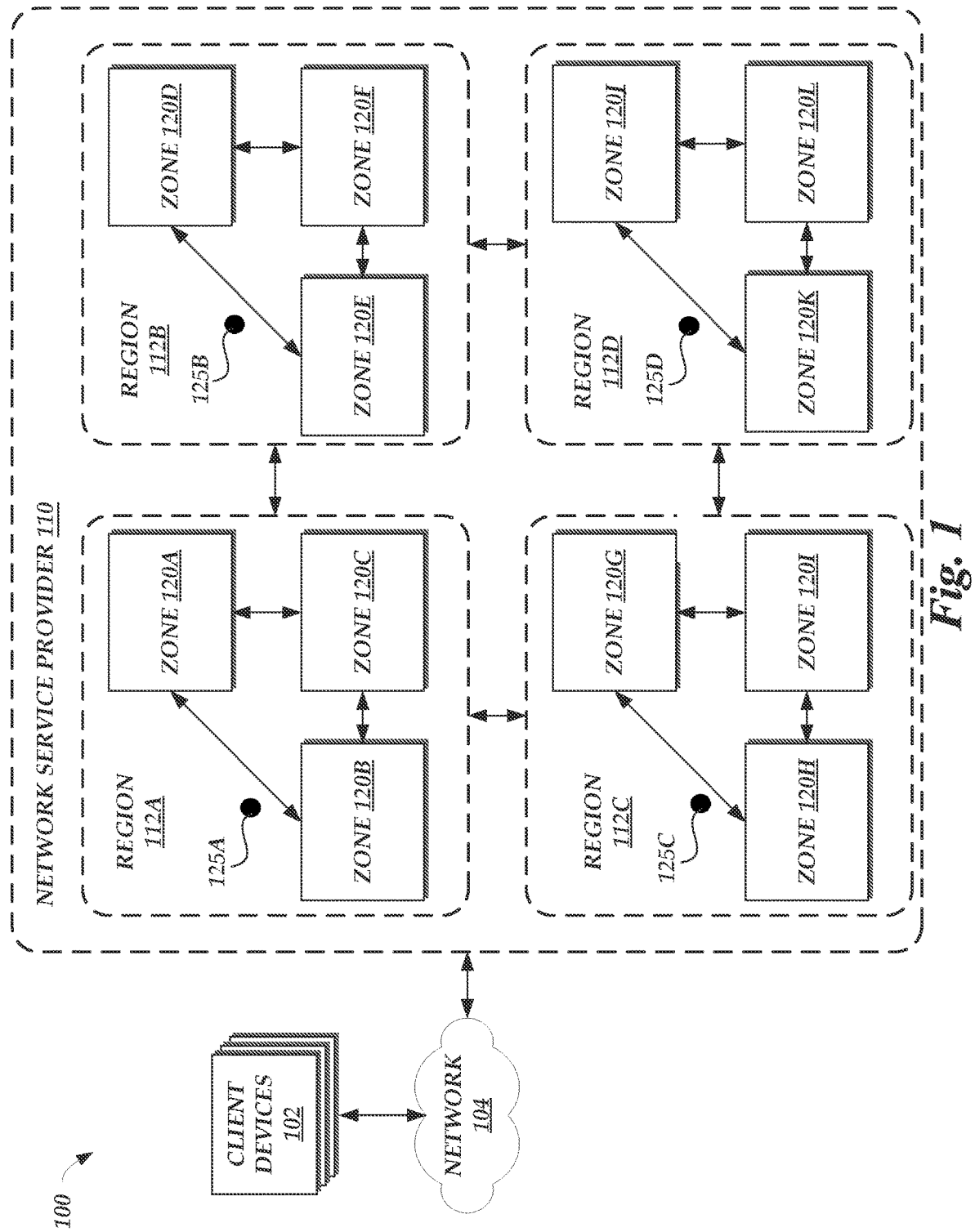
FIG. 1 depicts a schematic diagram of a network service provider in which various embodiments according to the present disclosure can be implemented.

Generally described, aspects of the present disclosure relate to the management of network-based failover services. Illustratively, customers can design applications that are partitioned across various isolated computing systems (referred to as "availability zones" or regions). When partitioned as such, each of the various zones or regions hosts a partition of the applications identical to the other partitions of the applications. If one of the zones or regions fails, the partitions of the applications hosted by the other zones or regions provide redundancy or failover, allowing the applications to continue running based on the resources in the other zones or regions. More specifically, aspects of the present disclosure relate to managing network-based failover services. When such a failure of one application partition does not obstruct operation of the application in other partitions, or negatively impact the data integrity of data associated with the application (i.e., when a failover workflow ensure that network requests, etc., are appropriate transitioned or directed to a backup partition), the application may be characterized as highly available because the partitions enable the application to be available more often than not.

Existing mechanisms for failover are overly complicated, significantly increase design work required by customers, and lack features that provide the customer visibility and control over the mechanisms. The present disclosure addresses such problems by providing network-based failover services (sometimes referred to as "failover services") that better coordinate failover workflow design and execution while maintaining data integrity of the data associated with the application partitions to enable highly available applications. The failover services described herein support a wide range of failover use cases. For example, the failover services described herein may provide support for failover between partitions when both a primary application partition and a secondary application partition are running in the cloud (for example, over the network) and when one of the primary application partition and the secondary application partition are running in the cloud and the other is running on customer (or other) premises. Similarly, the failover services described herein may provide support for the failover between partitions when the customer has a disaster recovery (DR) partition set up in the cloud or on premises for use in recovery after a failover event.

The network-based failover services of the present disclosure improve upon the faults of the existing mechanisms in various ways. For example, the failover services are highly available (for example, available substantially 100% of the time that the cloud computing system (also referred to as "cloud provider system" or "network service provider") is operational), managed services that orchestrate complex failover workflows for applications partitioned across multiple partitions of the cloud computing system, even during the most chaotic events. Additionally, or alternatively, the failover services may provide an authoritative source of state information for partitions or nodes of the applications hosted in multiple zones or regions. Furthermore, the failover services of the present disclosure enable customers to manually trigger failovers based on real-time conditions and/or business needs. In some embodiments, the network-based failover service automatically triggers failovers for an affected application based on conditions specified by the customer. For example, if the customer application or primary cell becomes unhealthy, the failover service may automatically trigger one or more actions, for example, initiating a failover to a backup or secondary cell. In some embodiments, the application cells correspond to application partitions, nodes, or other fault domains for the application. Thus, the terms cell, partition, and node may be used interchangeably herein. The failover services may also provide a visual editor to help the customers (1) create dependency trees for their applications when designing their applications and (2) understand how different applications, components thereof, and/or systems interact with each other. This may enable the customers to model failover workflows in an automated, predictable manner for administration by the failover systems described herein. The failover services may also provide event history logs and visibility into a current failover stage for audit and/or compliance purposes. Additional details regarding each of these benefits are provided below.

These and other aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

FIG. 1 depicts an example computing environment 100 in which a network service provider 110 provides network-based services to client devices 102 via a network. As used herein, a network service provider 110 implements network-based services 110 (sometimes referred to simply as a "network-based services 110" or a "services 110") and refers to a large, shared pool of network-accessible computing resources (such as compute, storage, or networking resources, applications, or services), which may be virtualized or bare-metal. The network service provider 110 can provide convenient, on-demand network access to the shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network 104 and the hardware and software in the network service provider 110 that provide those services.

As shown in FIG. 1, the network service provider 110 is illustratively divided into a number of regions 112A-D. Each region 112 may be geographically isolated from other regions 112. For example, region 112A may be geographically located on the U.S. east coast, region 112B may be geographically located on the U.S. west coast, region 112C may be geographically located in Europe, region 112D may be geographically located in Asia, etc. While four regions 112 are shown in FIG. 1, a network service provider 110 may include any number of regions. Each region 112 is illustratively in communication via a network, which may be a private network of the system 110 (e.g., privately owned circuits, leased lines, etc.) or a public network (e.g., the Internet).

In FIG. 1, each region 112 is further shown as divided into a number of zones 120 (across all regions 112, zones 120A-L), which may also be referred to as availability zones or availability regions. Each zone 120 illustratively represents a computing system that is isolated from the systems of other zones 120 in a manner that reduces a likelihood that wide-scale events, such as natural or man-made disasters, impact operation of all (or any two) zones 120 in a region. For example, the computing resources of each zone 120 may be physically isolated by being spread throughout the region 112 at distances selected to reduce a likelihood of a wide-scale event affecting performance of all (or any two) zones 120. Further, the computing resources of each zone 120 may be associated with independent electric power, and thus be electrically isolated from resources of other zones 120 (though the resources may still communicate with one another via a network, which may involve transmission of electrical signals for communication rather than power), independent cooling systems, independent intra-zone networking resources, etc. In some instances, zones 120 may be further isolated by limiting operation of computing resources between zones 120. For example, virtual machine instances in a zone 120 may be limited to using storage resources, processing resources, and communication links in that zone 120. Restricting inter-zone cloud or network-based computing operations may limit the "blast radius" of any failure within a single zone 120, decreasing the chances that such a failure inhibits operation of other zones 120. Illustratively, services provided by the network service provider 110 may generally be replicated within zones 120, such that a client device 102 can (if they so choose) utilize the network service provider 110 entirely (or almost entirely) by interaction with a single zone 120.

As shown in FIG. 1, each zone 120 is in communication with other zones 120 via the communication links. Preferably, the communication links between the zones 120 represent high speed, private networks. For example, zones 120 may be interconnected via private fiber optic lines (or other communication links). In one embodiment, the communication links between zones 120 are dedicated entirely or partially to inter-zone communication, and are separated from other communication links of the zone(s). For example, each zone 120 may have one or more fiber optic connections to each other zone, and one or more separate connections to other regions 112 and/or the network 104.

Each zone 120 within each region 112 is illustratively connected to the network 104. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. While the system 110 is shown in FIG. 1 as having a single connection to the network 104, multiple connections may exist in various implementations. For example, each zone 120 may have one or more connections to the network 104 distinct from other zones 120 (e.g., one or more links to an Internet exchange point interconnecting different autonomous systems on the Internet).

Each region 112A-112D includes an endpoint 125A-125D, respectively. The endpoints 125A-125D may comprise computing devices or systems through which the customer's application can access the network-based services 110. Information provided to one of the endpoints 125 may be propagated to all other endpoints 125. Each region 112 may include more than one endpoint 125 or each region 112 may not include even one endpoint 125.

Client computing devices 102 can include any network-equipped computing device, for example desktop computers, laptops, smartphones, tablets, e-readers, gaming consoles, and the like. Users can access the network service provider 110 via the network 104 to view or manage their data and computing resources, as well as to use websites and/or applications hosted by the network service provider 110. For example, users may access an application having a partition hosted by a zone 120A in the region 112A (for example, a primary) and a zone 120L in the region 112D (for example, a secondary partition).

In accordance with embodiments of the present disclosure, the application having partitions hosted in different zones may be able to withstand a failure in one of the zones 120 or regions 112 in which one of the partitions is operating. For example, if the primary partition hosted in zone 120A experiences a failure, any requests that would normally be handled by the primary partition in the zone 120A may be instead routed to and handled by the secondary partition running in the zone 120L. Such a failure may result in a failover scenario, where operations of the primary partition are transferred to the secondary partition for handling. Failover scenarios may involve manual actions by the customer associated with the application to request routing of communications and so forth from the primary partition to the secondary partition. However, embodiments of the present disclosure can also provide a highly available, managed failover service for applications having partitions hosted in different zones that enables the customer's application to withstand zone or region failures with reduced or minimal interaction from the customer during a failover scenario while maintaining data integrity during such failures and failovers.

Overview of Failover States

As described above with reference to FIG. 1, a customer application may include partitions hosted in a number of different zones 120 in the same or different regions 112. Each partition may comprise identical nodes (for example, worker nodes), where each node represents and/or is mapped to any combination of compute, storage, database, and networking resources. One or more of the partitions may be hosted in a zone that experiences a failure (for example, a hardware failure). The failover service described herein manages steps or actions (for example, failover workflows) in the event of such a failure. The partitions (or nodes) may operate in and transition between different states; the failover service may identify the state in which each partition is operating and cause one or more partitions change or transition between states at any given time. In some embodiments, nodes within a partition may operate in the same state as the partition or in a different state from the partition. The available states in which the partitions (or nodes) may operate are provided with reference to FIG. 2.

Figure 2:
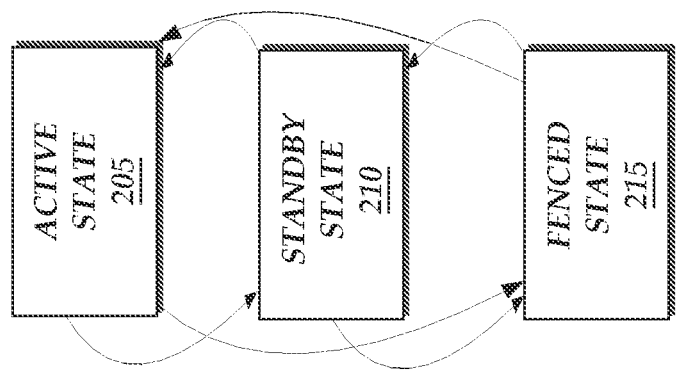
FIG. 2 depicts an example of a state machine diagram for application cells hosted in different zones of the network service provider as shown in FIG. 1.

FIG. 2 depicts an example of a state machine diagram for application cells hosted in different zones 120 of the network-based services 110 as shown in FIG. 1. As shown, the state machine diagram defines three distinct states that are available to the application partitions and nodes (sometimes referred to herein as application cells) hosted by the network-based services 110: an active state 205, a standby (or passive) state 210, and a fenced state 215. In some embodiments, the three shown states are the only available states. In some embodiments, additional or fewer states are available. Though reference below is made to the application partitions, the following discussion regarding states applies equally to the application nodes.

When in the active state 205, the application partition may receive and process queries (for example, read and write queries) or requests received from other entities. In some embodiments, the queries or requests comprise any operation that the application is capable of performing. For example, the read query comprises an operation where the partition reads or accesses data in a storage in the zone without manipulating any data in the storage. The write query may comprise an operation where the partition writes or modifies data in the storage. Thus, in the active state, the partition may operate with full capabilities, enabled to process any queries or requests the partition receives and which the partition is capable of processing. In some embodiments, a limited number of partitions operate in the active state 205 to protect from data overwrites and/or data losses. For example, only one partition operates in the active state 205 at any given moment. This may help maintain data integrity between different partitions by not allowing more than one partition to make changes to or modify (for example, write) data corresponding to the application. In some embodiments, the partition in the active state 205 is hosted by a zone that is not experiencing any failure.

When in the standby state 210, the partition may not receive or process any queries or requests. For example, the partition in the standby state 210 may not be accessible to entities using the application and/or may be unable to read from or write to the storage in the zone. Thus, in the standby state 210, the partition may not operate with any capabilities and may be disabled from processing any queries or requests the partition receives. In some embodiments, any number of partitions operate in the standby state 210, as partitions operating in the standby state 210 do not overwrite data or create data losses.

When in the fenced state 215, the partition may receive and process read queries or requests but not process any write queries. For example, the partition in the fenced state 215 may be accessible to entities requesting read operations from the storage but not accessible to entities requesting write operations for data in the storage. Thus, in the fenced state 215, the partition may operate with partial capabilities, enabled to process only read queries or requests the partition receives and which the partition is capable of processing. In some embodiments, any number of partitions operate in the fenced state 215, as partitions operating in the fenced state 215 do not overwrite data or create data losses. In some embodiments, the partition in the fenced state 215 is hosted by a zone that is experiencing or recently experienced a failure that prevents the partition from operating properly or that could adversely impact operation of the partition. In some embodiments, the customer defined the partition as being in the fenced state 215 irrespective of the state of the zone hosting the partition. By allowing the partition to operate in the fenced state 215, the partition may continue to service some requests (for example, the read requests only) while refraining from modifying information or data relevant to the application in the storage until the fenced partition changes state to the active state 205. Such a restriction may maintain data integrity by not allowing the partition to write over data while experience a failure or while another partition is operating in the active estate 205.

Overview of Zone and Managed Failover

Figure 3:
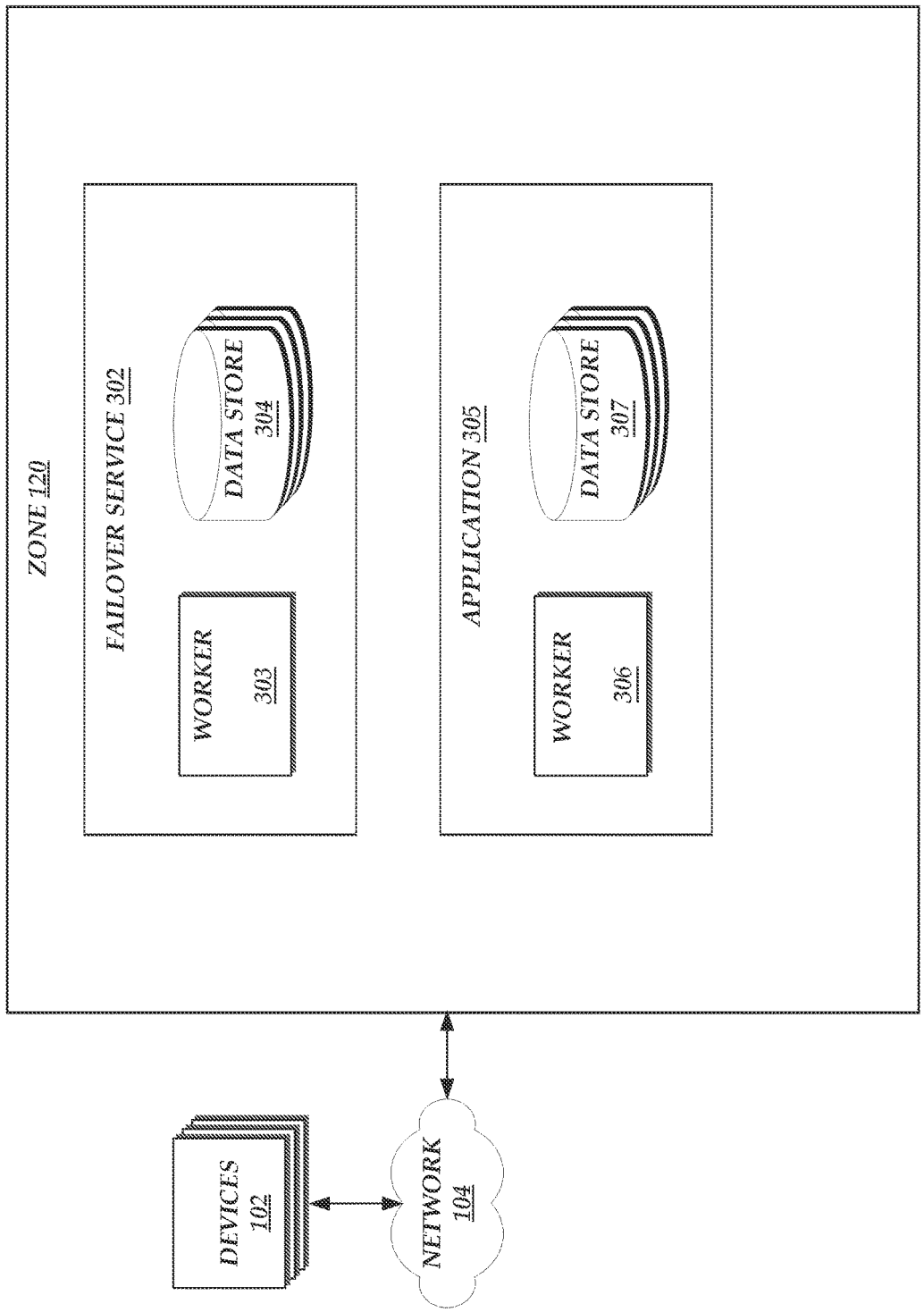
FIG. 3 depicts a schematic diagram of a zone of the network service provider of FIG. 1, including a failover service configured to implement failover between cells for an application in accordance with aspects of the present disclosure.

FIG. 3 depicts an example configuration of a zone 120A. As noted above, a zone 120 may represent an independent, isolated computing system providing a variety of services to or hosting a variety of applications accessible by client devices 102 independent of the computing systems of other zones 120. Thus, each zone may include a variety of computing, storage, and network resources that provide various services to client devices 102, as well as components to facilitate creation and management of such resources. One skilled in the art will therefore appreciate that the illustrative configuration of FIG. 2 is simplified for ease of description.

As shown in FIG. 3, the zone 120A includes the failover service 302, corresponding to the failover service described herein. Generally described, the failover service 302 enables the customer to control which application cells serve traffic for the application 305 and which cells do not. FIG. 3 also shows the client devices 102 that communicate with the zone 120A and define and monitor states for application cells (i.e., partitions or nodes) that provide the applications 305 to users. In some embodiments, each node of the partitions of the application 305 is associated with a state. In some embodiments, the nodes of a particular partition takes the state of the partition to which it belongs. In some embodiments, the individual nodes in the partition can have different states from each other or from the partition.

The failover service 302 shown in FIG. 3 may be a representation of a partition of the failover service 302. As used herein, the terms failover service and failover service partition may be used interchangeably. The partition of the failover service 302 shown in FIG. 3 includes a worker 303 comprising a node mapped to or corresponding to a compute resource. The failover service 302 also includes a storage 304, which may comprise a node mapped to a storage or database resource in which the failover service 302 may store data used by the failover service 302, such as state data, workflows, and so forth. The other partitions of the failover service 302 in other zones 120 may be identical to the failover zone 302 of FIG. 3.

This node 120A also includes an application 305. The application 305 as shown may be a representation of a partition of a partitioned application 305. As used herein, the terms application and application partition may be used interchangeably. The partition of the application 305 shown in FIG. 3 includes a worker 306 comprising a node mapped to or corresponding to a compute resource. The application 305 also includes a storage 307, which may comprise a node mapped to a storage or database resource and in which the application 305 may store data used by or relating to the application 305. The other partitions of the application 305 in other zones 120 may be identical to the application 305 of FIG. 3.

In some embodiments, network service provider 110 may ensure that the storage 304 of the failover service 302 is up-to-date with the storage of other partitions of the failover service 302 by propagating changes (for example, state change information) between the failover service 302 storages 304. In some embodiments, the network-based services 110 propagates the changes at a predetermined, dynamic, or customizable interval (for example, every 1 second, 1 minute, and so forth).

In some embodiments, network-based services 110 may ensure that the storage 307 of the application 305 is up-to-date with the storage 307 of other cells of the application 305. The network-based services 110 may propagate changes (for example, changes to the data stored in the storage 307) between the application storages 307. In some embodiments, the network-based services 110 propagates the changes at a predetermined, dynamic, or customizable interval (for example, every 1 second, 1 minute, and so forth).

Details of how the network-based services 110 uses the failover service 302 to define states for application cells and manage failover in the event of zone 120 or region 112 failures are discussed below.

In some embodiments, the network-based services 110 provides the highly available, managed failover service 302 for customer applications 305 distributed across any combination of zones 120, regions 112, and on-premises. As described herein, the failover service 302 itself may be distributed across multiple regions 112 and/or zones 120. For example, the failover service 302 may be partitioned between zones 120 in two or more of the regions 112A, 112B, 112C, and 112D. Such partitioning of the failover service 302 may ensure that at least one partition of the failover service 302 is always available, thereby ensuring that the failover service 302 is always available, even in the event that one or more zones between the regions 112A, 112B, 112C, and 112D fail at the same time. As such, the failover service 302 may be highly available.

Additionally, due to the partitioning of the failover service 302, the failover service 302 is able to serve as the authoritative source for state information for application partitions and nodes hosted by the network-based services 110. More specifically, by storing copies of state information and failover workflows for the application 305 distributed across multiple storages 304 of the partitions of the failover service 302, the failover service 302 is able to ensure that information matches between multiple storages 304 such that the information provided is more likely to be valid and accurate. For example, each partition of the failover service 302 includes a copy of state information for the application cells hosted by the network-based services 110 in the storage 304. Accordingly, the failover service 302 may guarantee strong consistency of state information for the application cells reported to the application cells or other entities. For example, to guarantee that the state reported by the failover service 302 is correct, the failover service 302 may confirm that a quorum of storages 304 of the failover service 302 indicates the state same state that is being reported. More specifically, before the failover service 302 can guarantee that a primary partition of the application 305 is in the active state 205, the failover service 302 may confirm that a majority of failure service storages 304 indicate that the primary partition of the application 305 is in the active state 205.

If the majority of failure service storages 304 does not indicate the active state 205, then the failover service 302 does not report that the primary partition of the application 305 is in the active state 205. In some embodiments, the quorum is a majority of the failure service storages. In some embodiments, the quorum is a set number (for example, three (3) or five (5)) of failover service storages 304 that must agree for the failover service 302 to guarantee that state (or other information) being reported.

In some embodiments, the customer may generate rules (or limitations) for its applications or the failover service 302 may include rules that limit how many partitions and/or nodes of the application 305 may operate in a given state. In some embodiments, the failover service 302 configures and enforces such rules. For example, the failover service 302 may allow the customer to identify, for example, how many partitions or nodes can operate in each state at any given moment. For example, the failover service 302 may limit a number of partitions or nodes allowed in the active state 205 to one (1) while allowing an unlimited number of partitions or nodes in each of the standby state 210 or the fenced state 215. In some embodiments, the failover service 302 may also limit the number of partitions or nodes allowed in the fenced state 215 to one (1). In some embodiments, by limiting the number of partitions or nodes that can write to a corresponding application storage to one, risks of data overwrite and data loss are mitigated. Additionally, such rules may enable the failure service to trigger manual and/or automated failovers. A manual failover may comprise the customer identifying to the failover service 302 and the network-based services 110 the change of states for, for example, the primary partition and the secondary partition. An automated failover may comprise the customer identifying that the primary partition changes state and the failover service 302 or the network-based services 110 identifying and performing subsequent workflow actions based on a generated failover workflow.

In some embodiments, the network-based services 110 utilizes a user interface (not shown in the figures) to enable the customers whose applications 305 are hosted by the network-based services 110 to create dependency trees and failover workflows for their applications 305. The dependency trees may map (for example, identify) and track upstream and downstream dependencies for the customer's applications to determine the steps to take in a failover to ensure data integrity between the application partitions and continued availability of the application 305. Furthermore, the failover service 302 and/or the network-based services 110 may map the upstream and/or downstream dependencies of sub-applications of the customer applications. Based on the mapped partitions and dependencies, the failover service 302 and/or the network-based services 110 may coordinate partition or node failover in a sequential manner for any of the individual applications provided by the network-based services 110. In some embodiments, the dependencies may comprise other applications or services that provide data, requests, and so forth to the application 305 or that receive data, requests, and so forth from the application 305.

In some embodiments, the interface is also used to identify failover workflows to be triggered based on the failover states and/or other conditions. The dependency trees and the workflows may be created when the customer designs and creates the application 305 or after the application 305 is created and partitioned. Such dependency trees and failover workflows may enable to the failover service 302 and the network-based services 110 to provide visibility into particular dependencies for the application 305s. For example, enabling the customer to see its application's upstream and downstream dependencies, the customer may better understand what sequence of steps or actions are needed during a failover of an application partition or node to ensure availability of the application 305 and data integrity for associated data and can generate the failover workflow accordingly. Thus, the customer may be able to more easily generate a workflow comprising the sequence of steps or actions needed when a failover occurs as opposed to when the dependency tree is not available.

In some embodiments, such the failover workflows may be manually triggered by the customer or automatically triggered by the failover service 302 based on the failover states of application partitions or nodes. By tracking the application dependencies and corresponding workflows, the network-based services 110 and failover service 302 may enable customers to orchestrate failover procedures for applications 305 in a safe, reliable, and predictable manner that maintains data integrity and application availability.

In some embodiments, the customer models their application and/or cells of their application using the failover service 302. The cells, as used herein, may represent partitions, nodes, or any unit of the application that could be a point of or experience a failure, for example, in a zone 120 or region 112. The customer can use the models of the failover service 302 to define the sequence of steps needed during the failover across one or more applications based on the dependency trees and the like. For example, if the customer detects a failure in the primary partition of the application 305, the customer can trigger an auto-scaling step to scale applications 305 in the secondary partition, after which the customer can trigger a traffic management service to redirect user traffic to the secondary partition. In some embodiments, the traffic management service manages network level routing of traffic. Such controls enable the customer to manage distributed, multi-tier applications in a controlled, reliable, and predictable manner. In some embodiments, the traffic management service routes traffic to an optimal application endpoint based on various parameters relating to performance of the application. In some embodiments, the customer can generate the workflow to include the actions identified above in the event the failure is triggered such that the actions are performed automatically by the failover service 302.

Similarly, the failover service 302 may provide such controls to the customer to configure workflows (for example, including traffic routing actions using the traffic management service and/or a Domain Name System (DNS) service) implemented based on state changes for application partitions or nodes. In some embodiments, the customer may also configure metadata with state changes for application partitions or nodes. For example, the application partition or node state change triggers a failover or changing of endpoint or traffic weights per zone 120 or region 112 for the traffic management service and/or the DNS service (also referred to herein as the routing service), which may enable automation of failover workflows and/or sequences of steps.

In some embodiments, the failover service 302 and the network-based services 110 enable simplified aggregation and tracking of events associated with the customer applications 305, including event history logs and the like. Thus, the customer may use the network-based services 110 to generate reports and/or audit trails of various events, such as state changes and/or details of failover workflows, such as visibility into a current failover workflow step or stage. Such reports or audit trails may enable ease of operations tracking and/or compliance.

Operation of Failover Services

As described herein, the failover service 302 for the customer application 305 may enable the customer to generate the failover workflow for the application that identifies one or more actions or steps to be taken should the primary partition of the application experience a failure. Thus, as described above, the failover workflow may include steps to take to ensure continued operation of the application and maintained data integrity through individual partition failures. For example, the workflow may include identification of the secondary partition that is a backup to the primary partition (for example, becomes a new primary partition) when a previous primary partition experiences a failure. The failover workflow may also define the state to which the primary partition transitions when it experiences a failure (for example, the standby state 210 or the fenced state 215). Though reference herein is made to primary and secondary partitions, the failover services and the failover workflow may apply equally to primary and second nodes.

In some embodiments, the network-based services 110 of the failover service 302 stores the failover workflow generated by the customer in the storage 304 associated with the failover service 302. Alternatively, or additionally, the workflow is stored in a storage of the network-based services 110, in a storage 307 associated with the application 305, or in an external storage. The workflow may be accessed as needed when the primary partition changes state, when the customer indicates or requests the failover, or when the failover service 302 requests the failover. Once the failover workflow is stored, the failover services 302 may await a state change or other condition that triggers the failover workflow, for example a state change of the primary partition.

The customer may assign one of the mutually exclusive states described above (the active state 205, the standby state 210, and the fenced state 215) to each partition of the application 305. Such assignment of states may be communicated to the failover service 302. In some embodiments, the primary partition is in the active state 205 when the failover workflow is stored and the secondary partitions are in the standby state 210. When the primary partition is operating in the active state 205, the DNS service or the traffic management service may direct traffic (for example, read and write requests) for the application 305 to the primary partition.

In some embodiments, the failover service 302 may determine that the state of the primary partition changes, for example from the active state 205 to the fenced state 210. In some embodiments, the failover service 302 may detect the change in the state of the primary partition based on receiving an indication from the customer or from automatically detecting a change in the state of the primary partition made by the customer. In response to this change of state of the primary partition, the failover service 302 may reference the failover workflow for the corresponding application to identify what actions to take. For example, the failover service 302 identifies the secondary partition that is to operate as the backup to the primary partition. In some embodiments, the secondary partition that operates as the backup to the primary partition is the secondary partition that enables or maintains a largest similarity of dependencies as the primary partition, thereby reducing changes in upstream and/or downstream dependencies as much as possible. In some embodiments, when the primary partition changes to the fenced state 215, the workflow includes instructions for the DNS service and/or the traffic management service to direct read requests to either of the primary partition or the backup secondary partition and to direct all write requests to the backup secondary partition that operates as the backup. Alternatively, when the primary partition changes to the standby state 210, the failover workflow instructs the DNS service and/or the traffic management service to direct all read and write requests to the backup secondary partition. In some embodiments, the failover workflow identifies the sequence of states into which the primary and secondary partitions transition along with failover step or action sequences. Further details of the operation of the failover service with respect to the change of state of the primary partition are provided below with respect to FIG. 4.

In some embodiments, the failover workflow for the application 305 may additionally or alternatively comprise one or more actions or steps to be taken should a secondary partition or node experience a failure. For example, should the backup secondary partition experience a failure, the failover workflow may identify an alternative backup secondary partition from remaining secondary partitions.

The failover workflow may comprise one or more reconciliation steps comprising one or more actions that ensure that the secondary partition is prepared to transition to the active state 205 (for example, confirming that the primary partition has transitioned from the active state 205 to another state) while maintaining data integrity until and through the transition. In some embodiments, the one or more reconciliation steps also include the step of instructing the traffic management service and/or the DNS service to route requests to the secondary partition. Once the one or more reconciliation steps are completed, the secondary partition may be promoted from the standby state 210 (or the fenced state 215) to the active state 205, and all requests associated with the application may be routed to the secondary partition in the active state 205. The failover service may replicate the state change information for the primary and secondary partitions post failover in the corresponding storages in the zones 120 and regions 112 in which the failover service application is partitioned. By updating the state change information for the primary and secondary partitions post failover, the failover service may provide a consensus or quorum view of current states for the primary and secondary partitions.

As described above with reference to FIG. 1, customer applications may be partitioned across zones 120, regions 112, and/or on-premises (for example, for disaster recovery purposes). In some embodiments, the partitions are identical and comprise identical nodes, where each node represents and/or is mapped to any combination of compute, storage, database, and networking resources. In some embodiments, each node polls the failover service 302 or the network-based services 110 to determine the current state of the node. As such, state conditions can trigger particular actions at the node level for the failover workflow.

The failover service 302 or the network-based services 110 may track states of nodes, partitions, and other components of the network-based services 110 in the storage 304. In some embodiments, the failover service 302 and/or the network-based services 110 may receive updated state information from the customer or automatically by determining or detecting a node, partition, zone 120, or area 112 is experiencing a failure. When the updated state information is received, the failover service 302 may attempt to update or propagate the storages 304 in all the failover service partitions 302, as described above.

Figure 4:
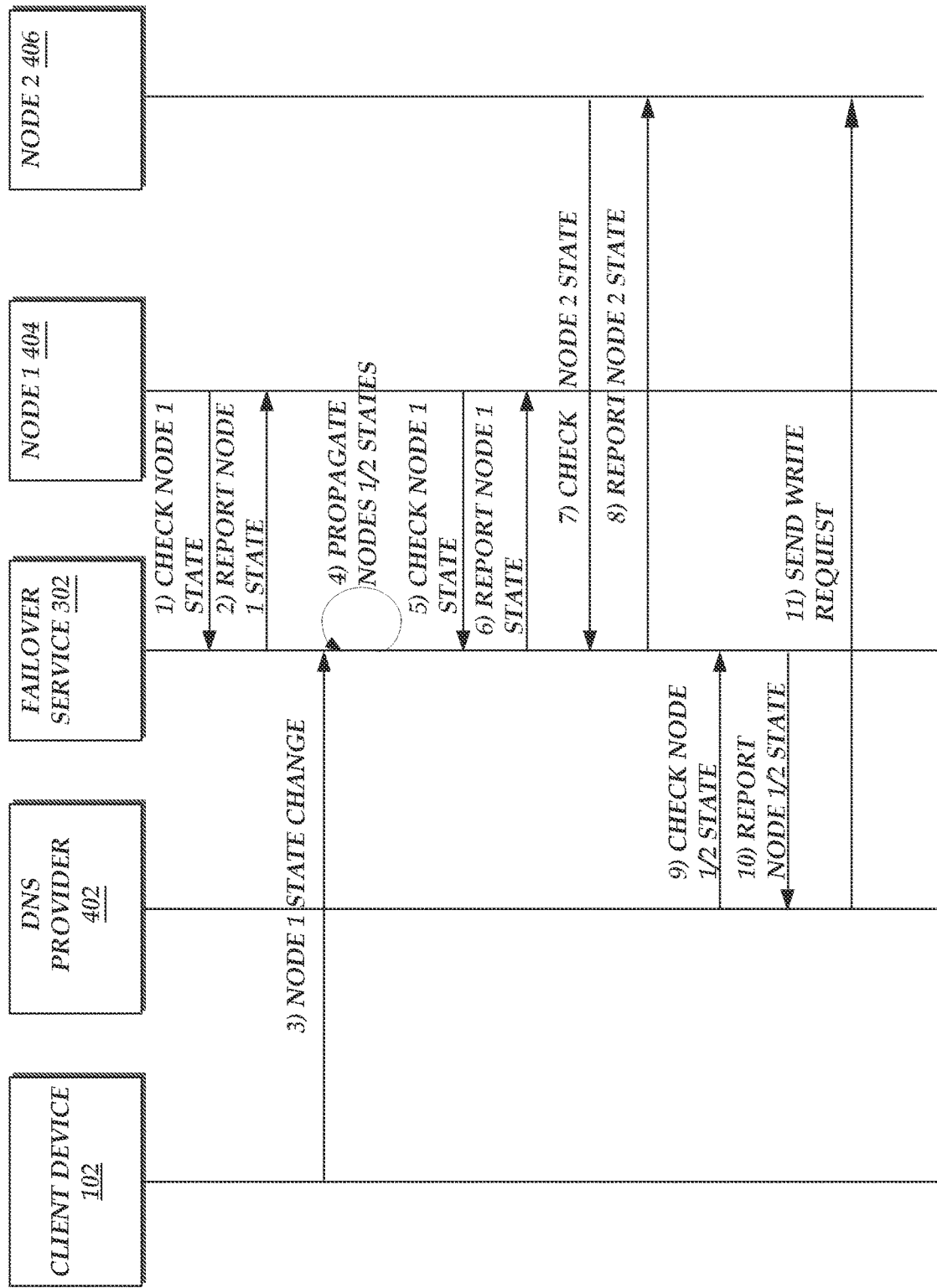
FIG. 4 depicts an example workflow of interactions that implement the highly available failover service of FIG. 3 in accordance with aspects of the present disclosure.

With respect to FIG. 4, an example workflow of interactions that implement the highly available failover service 302 is shown in accordance with aspects of the present disclosure. As shown in FIG. 4, implementing the highly available failover service 302 involves communications between many devices, systems, or entities. For example, the client device 102, the DNS provider or traffic management service 402, the failover service 302, and a plurality of nodes (for example, node 1 404 and node 2 406) communicate when implementing the failover service 302.

At (1), the node 1 404 may poll the failover service 302 to identify the state of the node 1 404. In some embodiments, the polling by the node 1 404 occurs continuously or at predetermined or custom intervals. In some embodiments, the node 1 404 may poll a single partition of the failover service 302 or one or more endpoints of the failover service 302.

At (2), the failover service 302 reports the state for the node 1 404 to the node 1 404. In some embodiments, the failover service 302 only reports the state for the node 1 404 to the node 1 404 when the state is confirmed by a quorum of storages 304 of the failover service 302. As described above, by limiting the reporting of the state to only information confirmed by the quorum of storages, the failover service 302 can guarantee that the state information for the node 1 404 is accurate. For example, at (2), the failover service 302 reports that the node 1 404 is in the active state 205, as confirmed by the quorum of storages 304. Though not shown in FIG. 4, before, at the same time, or after the communications (1) and (2) between the node 1 404 and the failover service 302, the node 2 406 may exchange communications with the failover service 302 to determine the state of the node 2 406, which the failover service 302 may report (after confirming with the quorum of storages 304) as being the standby state 210.

At (3), the customer indicates a change of state for the node 1 404 to the failover service 302. In some embodiments, the customer indicates the change of state via an interface with the failover service 302 and/or the network-based services 110 (for example, an application programming interface (API)). As described herein, since the failover service 302 is partitioned or distributed in various zones 120 and regions 112, the customer may access the interface to indicate the change of state at substantially any point in time. As such, the interface and the failover service 302 are highly available. In some embodiments, the failover service 302 may automatically detect a change of state of the node 1 404 (or any other cell) based on a determination that a failure has occurred in a given zone 120 or region 112. Thus, at (3), the customer indicates a change of state for the node 1 404 from the active state 205 to the fenced state 215.

At (4), the failover service 302 propagates the change of state from (3) to the storages 304 distributed in other zones 120 and regions 112. In some embodiments, the propagation of state information occurs at predetermined or customizable intervals or continuously, as described herein. In some embodiments, the propagation of state information may occur bidirectionally for each failover service partition 302, such that each failover service partition 302 updates the state information stored in its storage 304 with state information received from other failover service partitions 302 and causes updates in other storages 304 by transmitting state information updates received from the customer. Thus, at (4), the failover service 302 propagates the node 1 404 fenced state 215 to the storages 304, allowing any partition of the failover service 302 to have access to the same state information for the partitions of the application 305.

At (5), the node 1 404 again polls the failover service 302 to identify the state of the node 1 404. As above, the polling by the node 1 404 may occur continuously or at predetermined or custom intervals. In some embodiments, the node 1 404 may poll a single partition of the failover service 302 or one or more endpoints of the failover service 302.

At (6), the failover service 302 reports the updated fenced state for the node 1 404 to the node 1 404. In some embodiments, the reported state for the node 1 406 does not include any state information for any other node 406 of the application 305. In some embodiments, the failover service 302 only reports the state for the node 1 404 to the node 1 404 when the state is confirmed by a quorum of storages 304 of the failover service 302 (thus after the fenced state is propagated to the storages 304 after (4)). Thus, at (6), the failover service 302 reports that the node 1 404 is in the fenced state 215, as confirmed by the quorum of storages 304.

At (7), the node 2 406 polls the failover service 302 to identify the state of the node 2 406. The different nodes of the application 305 are unaware of states of other nodes of the application 305; as such, the node 2 406 may poll the failover service 302 to identity the state of the node 2 406 to determine whether the node 2 406 needs to prepare itself for any particular actions (for example, to determine whether any failover workflow actions apply to the node 2 406). Similar to the polling by the node 1 404, the polling by the node 2 406 may occur continuously or at predetermined or custom intervals. In some embodiments, the node 2 406 may poll a single partition of the failover service 302 or one or more endpoints of the failover service 302.

At (8), the failover service 302 reports the updated active state for the node 2 406 to the node 2 406. In some embodiments, the reported state for the node 2 406 does not include any state information for any other node 406 of the application 305. In some embodiments, the change in the state of the node 2 406 from standby to active is defied by a failover workflow initiated when the customer indicates the change of state of the node 1 404 to fenced and initiates the failover workflow. In some embodiments, the node 2 406 is the secondary or backup node to the primary node 1 404. When the node 1 404 changes state to the fenced state 215 due, the failover workflow instructs that the secondary node 2 406 take over processing and operations of the primary node 1 406. The failover service 302 may only report the state for the node 2 406 to the node 2 406 when the state is confirmed by a quorum of storages 304 of the failover service 302 (thus after the instructions defining the state of the node 2 406 as being active are propagated to the storages 304 after (4)). Thus, at (8), the failover service 302 reports that the node 2 406 is in the active state 205, as confirmed by the quorum of storages 304.

At (9), the routing service 402 (for example, the DNS service or the traffic management service) polls the failover service 302 to identify the states of the node 1 404 and the node 2 406. As described herein, the routing service 402 may poll the failover service 302 to understand which nodes are active and/or available for processing application requests. In some embodiments, the routing service 402 may poll the failover service 302 for state of the node 1 404 and the node 2 406 continuously or according to a predetermined or customizable interval. In some embodiments, the routing service 402 may poll the failover service 302 for the state of the node 1 404 each time the routing service 402 receives a request to route to the node 1 404 (and so forth).

At (10), the failover service 302 may report the node 1 404 and node 2 406 states to the routing service 402. In some embodiments, the failover service 302 reports the node 1 404 and node 2 406 states to the routing service 402 before the routing service 402 requests the states (for example, automatically at a predetermined or customizable interval). The failover service 302 may only report the state for the node 1 404 and the node 2 406 to the routing service 402 when the states are confirmed by a quorum of storages 304 of the failover service 302. Thus, at (10), the failover service 302 reports that the node 1 404 is in the fenced state 215 and that the node 2 406 is in the active state 205, as confirmed by the quorum of storages 304.

At (11), the routing service 402 routes an application write request to the node 2 406 operating in the active state 205. In some embodiments, when the node 1 404 is in the fenced state 215 and the node 2 406 is in the active state (as determined by polling the failover service 302), the routing service 402 may route read requests to either the node 1 404 or the node 2 406.

Thus, FIG. 4 depicts how different components may interact to identify a change of state or failover and manage a workflow of actions to take when the change of state or failover is initiated.

When customers implement failover workflows using the failover services 302, the network-based services 110 may provide a dedicated infrastructure stack partitioned across multiple regions 112 for the customers to store their application state information in a highly available manner. Using the failover service 302, the customers can launch applications that span across multiple cells. These cells can be any combination of zones 120, regions 112, and on-premises. Within these applications, the cells may be replicated across the zones 120, regions 112, and on-premises. In some embodiments, these cells are mapped to individual or a group of cloud or network-based service and/or storage resources. The customers can set one of the three states (active 205, standby 210, and fenced 215) to each cell. Once the state of a cell is set, the failover service 302 propagate the node states within the infrastructure stack across the multiple regions 112 to get a quorum. The resources that are mapped to these cells may continue (for example, continuously or at an interval) poll the failover service 302 APIs to understand the cell's state. Moreover, the routing service may poll the failover service 302 to understand which resource to route traffic (for example, the received application requests) towards. When the state of a cell is updated, this change is again propagated across the infrastructure stack to get the consensus state. To integrate with the routing service or traffic management service, customers can create a dependency tree and associate the respective cells that are a part of the dependency. For example, to failover traffic between two cells hosted in 2 different regions, customers can create nodes in two partitions and tie the two partitions together in a dependency tree such that the traffic management service is able to route traffic between the two partitions.

Figure 5:
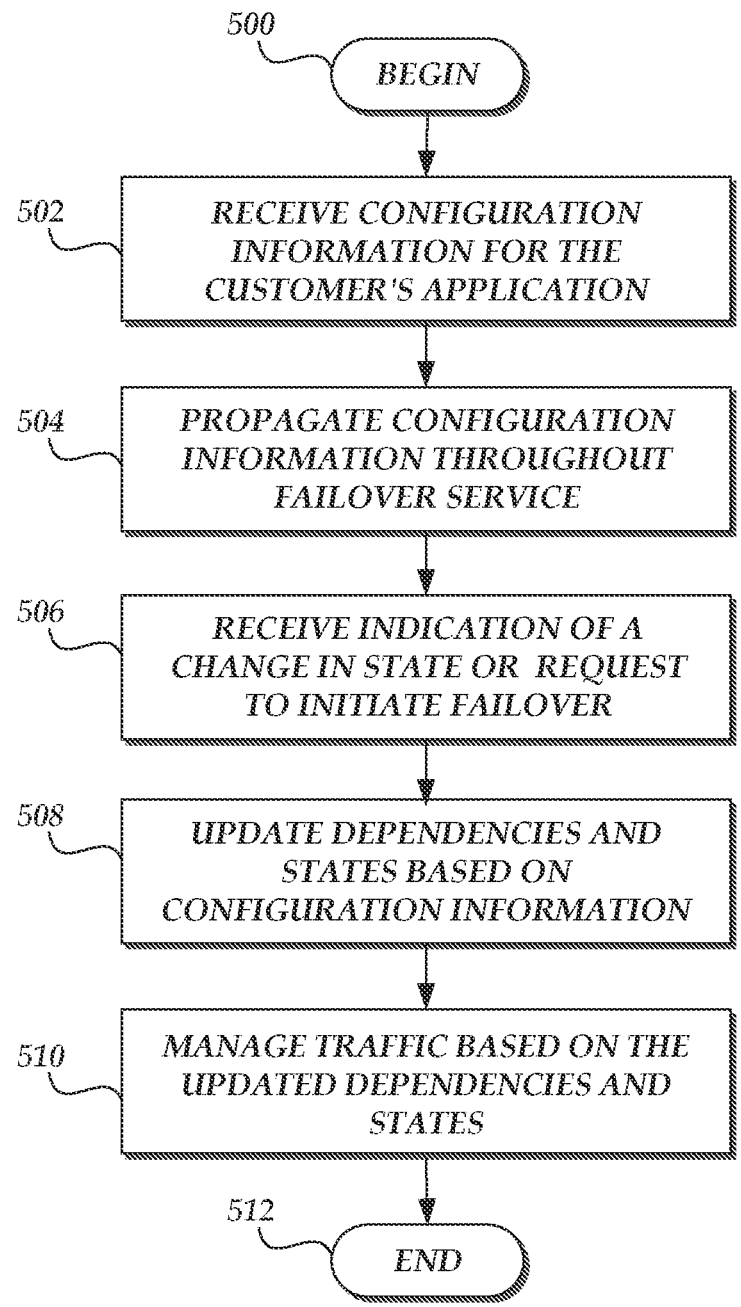
FIG. 5 is a flowchart of an example routine for handling a failover of at least a portion of an application in accordance with aspects of the present disclosure.

With reference to FIG. 5, an illustrative routine will be described for implementing aspects of the present disclosure. Specifically, FIG. 5 depicts an illustrative routine for handling a failover of at least a portion of an application in accordance with aspects of the present disclosure.

With reference to FIG. 5, the routine 500 begins at block 502, where the network-based services 110 or the failover service 302 (for example, the worker 303) receives configuration information for the customer's application 305. In some embodiments, the configuration information comprises identifiers for cells of the application 305, dependencies of the application 305, states of the different cells of the application 305, and a failover workflow. In some embodiments, the identifiers comprise identifiers for each of a plurality of cells of the application distributed across a number of zones 120 or regions 112. In some embodiments, the failover workflow comprises actions to take in the event of a failover event for one or more cells of the application based on one or more of the state of each cell and the one or more dependencies for the application 305. In some embodiments, the configuration information is received via the user interface.

At block 504, in response to the receipt of the configuration information, the failover service 302 (for example, via the worker 303) may store the configuration information in the storage 304 and then propagate the configuration information to other failover service partitions 302 (for example, other storages 304) distributed in other zones 120 and regions 112. In some embodiments, the propagation of the configuration information between or with the other storages 304 comprises updating the states for the corresponding cells to the other storages 304 and communicating the failover workflows, application dependencies, and other configuration information to the other storages 304. Such propagation of the configuration information enables the failover service 302 to provide the highly available service described herein. Additionally, sharing the configuration information and updated states between or with the other storage 304 also enables the failover service 302 to provide highly consistent data since the data stores are updated with the same data and information.

At block 506, the failover service 302 (for example, via one of the partitions of the failover service 302) receives an indication of a change in state of one of the cells (for example of the primary cell) of the application 305 or a request to initiate the failover (for example, in response to a failover event). In some embodiments, the indication may be received from the customer directly, for example via the user interface that is in data communication with the failover service 302. In some embodiments, the indication is detected by the failover service 302 or the network-based services 110 automatically based on detecting a failure in a node 120 or region 112 or similar component. In some embodiments, the change of state or failover request is propagated to other partitions or cells of the failover service 302.

At block 508, the failover service 302 (for example, via the worker 303) accesses the failover workflow (for example, from the storage 304). The failover service 302 identifies actions to take during or following the failover event, as described above. For example, the failover workflow identifies new states for one or more application cells or partitions, dependencies to be updated, and so forth. The failover service 302 may use the actions in the failover workflow to update the state and dependencies to maintain operability of the application 302 and maintain data integrity of the application 305 during and following the failover event. For example, the failover service 302 may update the primary cell to have the fenced state 215 or the standby state 210 and update a secondary cell to have the active state 205.

At block 510, the failover service 302 ensure that the network-based services 110 manages traffic for the application 305 based on the updated states and dependencies. For example, the failover service 302 ensures that the traffic management service and/or the routing service and the DNS service provider routes traffic for the application 305 appropriately to ensure the continued operation of the application while maintaining data integrity of the application 305. Thus, the failover service 302 may ensure that traffic routing is updated between the primary cell and the secondary cell Though not shown in FIG. 5, the failover service 302 may be further configured to identify that the primary cell changes state from the active state to the fenced state and may route at least a portion of read traffic to the primary cell for at least a duration of time after the primary cell changes state to the fenced state. This may allow a secondary cell that replaces the primary cell as having the active state to have some time to complete its state transition and get up to speed before being targeted for application requests. In some embodiments, and described herein, the failover service 302 uses a quorum of storages 304 distributed among the different zones 120 and regions 112 to identify that the primary cell change state from the active state 205, for example to the fenced state 215 or the standby state 210.

Example Failover Service Workflows

The failover service 302 described herein may be implemented differently by different parties in the network-based services 110. For example, the customer developing an application 305 may use the following workflow to integrate the failover service 302 and enable the customer to trigger failover for one or more cells of its application 305.

At (1), the customer may launch the application 305. The customer may model the application 305 or cell of the application 305 that is to be replicated across partitions using the failover service 302 by providing identifiers for the application 305 and the cells of the application 305. In some embodiments, launching the application 305 comprises providing configuration information comprising identifiers for cells of the application 305, dependencies of the application 305, states of the different cells of the application 305, and a failover workflow.

At (2), the failover service 305 may create partitions across which the application 305 is replicated. As described herein, the partitions can be any hosted by any combination of zones 120, regions, 112, or on-premises.

At (3), the customer create nodes within the application 305. In some embodiments, the nodes represent or are isolated worker units within the application 305 that are automatically replicated across the application partitions 305. The customers may also set the state of the nodes to one of the following states, as described herein: Active/Passive/Fenced. In some embodiments, the customer may set the state manually through the interface or through an automated workflow. In some embodiments, each state optionally comprises some metadata that is shared with dependencies of the application 305 as identified by the dependency tree of the application 305.

At (4), the customer uses the failover service 302 to create dependencies for the application 305. The customers may configure the dependencies, such as the routing service and/or the traffic management service, and associate nodes of the application 305 that will interface with these dependencies. In some embodiments, the dependencies will poll the failover service 302 to identify and understand the state of every node of the application 305. Based on the state of every node of the application, the dependencies may return specific metadata, and actions (for example, of a failover workflow) can be triggered, such as changing an amount of request traffic directed to a particular node, based on the state of every node of the application 305.

At (5), the failover service 302 may trigger a generated failover workflow. Triggering the failover workflow may comprise using a rule engine to model a sequence of steps that need to be enforced when a state change of one of the nodes is triggered.

Alternatively, a site reliability engineer may use the following workflow.

At (1), the customer uses the failover service 302 to create a dependency tree of all applications 305. For multi-tier applications, the different applications 305 can be grouped into tiered failover groups. In some embodiments, the failover service 302 and/or the network-based services 110 includes a visual editor that enables the customer to drag and drop the failover groups and to display any dependency conflicts.

At (2), the customer creates the failover workflow, which defines the sequence of activities that need to take place when a failover is triggered.

At (3), the failover service 302 monitors status of all-in failover of the multi-tier application. For all-in failover drills, the multi-tier dependency tree may provide visibility into the state of failover at an individual application level and at a failover group level.

In some embodiments, the customer may use the failover service 302 to manually failover traffic to a secondary cell via the traffic management service. For example, the customer's application includes a first instance running in a first, primary region and a second instance running in a second, secondary region and the customer wants to failover traffic to the secondary region manually.

At (1), the customer create the application that is replicated across two (2) partitions, one hosted in the primary region and the other hosted in the secondary region.

At (2), the customer creates a node within the application and assigns the node a name "Node 1". This node may automatically appear in both partitions.

At (3), the customer sets the state of the node in the primary region as "Active" and sets the state of the node in the secondary region as "Passive". The customer also configures two exclusion rules: Active & Active=False, which prevents both nodes from being in the active state 205 at the same time, and Passive & Passive =False, which prevents both nodes from being in the standby state 210 at the same time.

At (4), the failover service 302 configures metadata for each of the states in the form of key value pairs. For example, for the active and passive states, the metadata can comprise the below key-value pairs:

```
Active:
{
Node: Node 1
Dependency: Global Accelerator
Global Accelerator arn : aws:globalaccelerator::123456
Partition: Primary
Traffic Dial: 100%
}
Passive:
{
Node: Node 1
Dependency: Global Accelerator
Global Accelerator arn : aws:globalaccelerator::123456
Partition: Secondary
Traffic Dial: 0%
}
```

At (5), the customer uses the failover service 302 to create a dependency called "Global Accelerator" and associate both nodes with this dependency. Global Accelerator may poll the dependency (for example, continuously or at intervals) and may be returned the metadata, based on which the Global Accelerator will dynamically configure traffic dials for an active/passive set up.

At (6), to manually failover traffic to the secondary region, the customer updates the Node 1 node in the secondary region to "Active". This will automatically transition the state of the Node 1 node in primary region to "Passive". The metadata will be updated and returned to the traffic management service.

Example Interactions for Enforcement of
Read-Only States

As described above, the failover service defines the active state 205, the standby state 210, and the fenced state 215, each of which is associated with different available capabilities. For example, the fenced partition or node may serve or process read requests but may not serve or process write requests. Since the different states indicate different capabilities, it is important that the corresponding states be enforced by the various components of the network-based services 110. For example, enforcement of these states and corresponding available capabilities or restrictions allows the failover service and the network-based services 110 to prevent a "split-brain" scenario, in which multiple partitions or nodes for a single application process write requests regarding stored data or information. Such a scenario may result in overwritten data (for example, where the multiple partitions or nodes are writing to the same data) and compromised data integrity.

In some embodiments, the fenced state 215 may be enforced and/or coordinated by restricting or denying write requests at various levels in the network-based services 110 while allowing read requests. In some embodiments, the standby state 210 may be enforced and/or coordinated by restricting or any all requests. The customers may be responsible for denying requests at an application tier. However, making the customers responsible for denying requests may place a large burden on the customers, asking them to exert a high degree of effort to make, test, and deploy changes (for example, to database access logic) to their applications to properly respect the state changes and corresponding capabilities or restrictions. Alternatively, storage providers may be responsible for denying requests at a storage tier. Thus, the storage providers may be responsible to adopt the states defined by the failover service, and each provider may need to go through a similar level of effort as the customer to enforce the states.

An alternative for enforcing the states defined by the failover service that is relatively invisible to the customers and storage providers is applying, at a communication tier or wire-level, a proxy system implemented by the failover service or the network-based services 110. For example, the proxy system may review and validate the database requests and associated options against the current state of a cell (for example, a particular partition or node of an application). The proxy system may allow the failover service and/or the network-based services 110 to support new data stores and/or new customer applications by way of basic protocol support for the new data store without necessitating customized changes to the data stores or customized protocol support for the data stores. Thus, adoption of the states defined by the failover service and the network-based services 110 may correspond to integration or adoption of the proxy system. The proxy system may then be added to existing network-based services 110 infrastructure during deployment and by updating endpoint configurations to route corresponding requests (for example, read/write requests to fenced partitions or nodes) through the proxy system so that the proxy reviews the requests.

Figure 6:
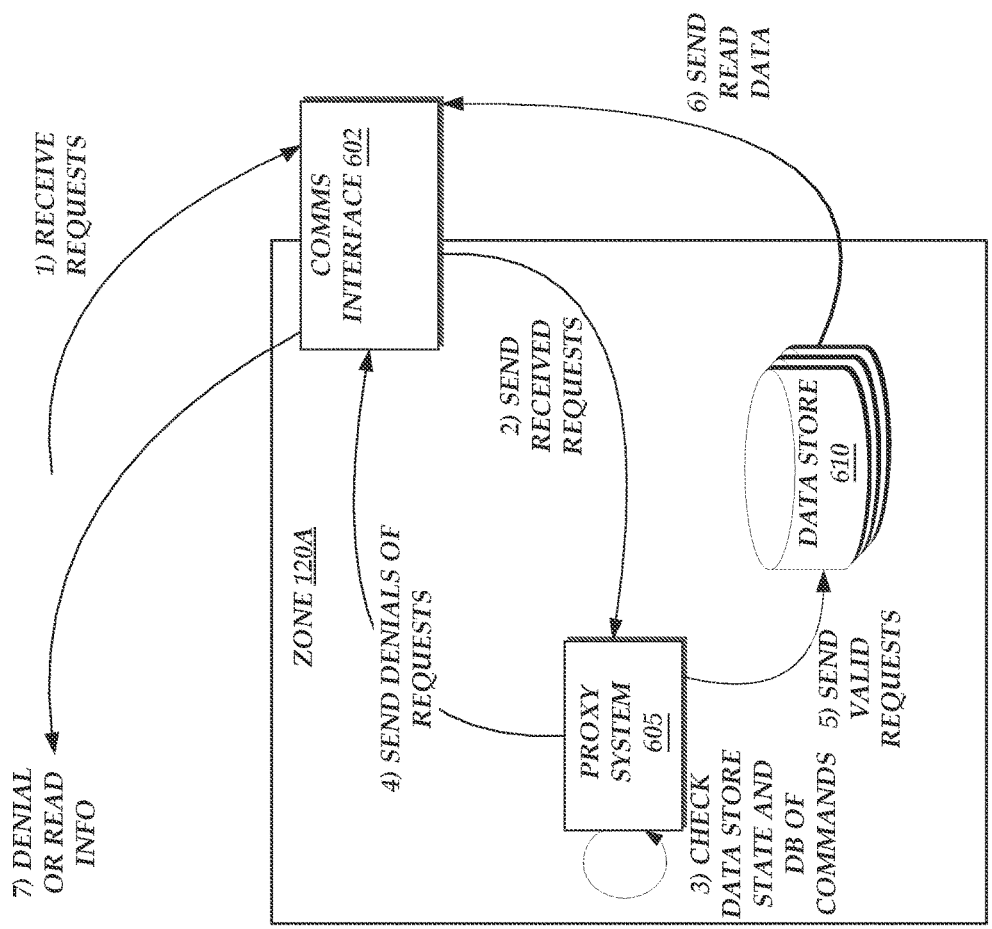
FIG. 6 depicts an example workflow for enforcing a read-only application state as defined by the failover service of FIG. 3 in accordance with aspects of the present disclosure.

With respect to FIG. 6, illustrative interactions are shown for enforcing a read-only application state in accordance with aspects of the present disclosure. As shown in FIG. 6, the zone 120A interfaces with a communications interface 602 and hosts a proxy system 605 and a data store 610. Though not shown, the data store 610 may be replaced by a cell of the application 305 for the discussion below. In some embodiments, the data store 610 is associated with an application having a partition that is hosted by the zone 120A. In some embodiments, though not shown in FIG. 6, the zone 120A also hosts at least one partition of the application providing the failover services described herein.

The communications interface 602 may be configured to communicate with one or more other zones 120, users, the Internet, and so forth. In some embodiments, the communications interface may receive requests for the application 305 that are directed to the data store 610. At (1), the communications interface 602 receives one or more requests related to one or more of the applications hosted by the zone 120A. The one or more requests received by the communications interface 602 may be directed to the data store 610. The data store 610 may comprise any type of non-transitory data storage component that stores data related to the applications hosted by the zone 120A.

At (2), the communications interface 602 routes all of the received requests to the proxy system 605. Accordingly, all application requests directed to the data store 610 are routed to the proxy system 605. In some embodiments, the communications interface 602 does not perform any analysis or processing of the received requests, aside from forwarding them to the proxy system 605. In some embodiments, the communications interface 602 routes the requests to the proxy system 605 instead of to the data store 610 to which the requests are directed.

At (3), the proxy system 605 determines a state of the data store 610, for example the state in which the data store 610 is operating (for example, one of the active state 205, the standby state 210, and the fenced state 215). For example, the proxy system 605 reviews polls the failover service to determine whether the data store 610 is in one of the active state 205, standby state 210, and the fenced state 215. In some embodiments, the proxy system 605 polls the failover service to determine the state of the data store 610 every time it receives a request forwarded from the communications interface 602. In some embodiments, the proxy system 605 polls the failover service at predetermined or dynamic intervals such that the proxy system 605 does not need to poll the failover service with every request. For example, the predetermined or dynamic interval may be 0.01 second, 0.1 second, 1 second, one 1 minute, and so forth. The proxy system 605 may continue to poll the failover service to identify when the data store 610 changes state.

At (3), the proxy system 605 may also identify a database of commands that the data store 610 is permitted or able to process dependent on the state of the data store 610 as well as a database of commands that the data store 610 is not permitted or able to process dependent on the state of the data store 610. In some embodiments, each of the storages 304 of the failover service 302 may comprise these databases of acceptable and unacceptable commands. In some embodiments, the acceptable and unacceptable commands may be stored in a single database.

The proxy system 605 may poll the failover service 302 for the state information for the data store 610. In some embodiments, the proxy system 605 specifically polls one or more endpoints 125 of the failover service 302 for the state information. In some embodiments, the state information returned may be based on a quorum of the one or more endpoints 125. In some embodiments, the proxy system 605 may poll the failover service 302 for the acceptable and/or unacceptable commands for the data store 610 given the state of the data store.

Based on the state of the data store 610, the proxy system 605 will access the acceptable and unacceptable commands for the state of the data store 610. The proxy system 605 may parse each request to identify one or more commands in the request. The proxy system 605 may then identify whether that request is an acceptable request based on comparing the associated one or more commands to the acceptable and unacceptable commands for the data store 610 state. In some embodiments, identifying the one or more commands in the request comprises inspecting individual packets of the request, for example as described below. If the request includes only acceptable commands, then the request will be determined to be a valid request. If the request includes any unacceptable command, then the request will be determined to be an invalid request.

In some embodiments, the active state 205 includes all commands as acceptable commands, the standby state 210 includes no commands as acceptable commands, and the fenced state 215 includes read commands (commands where no data is modified or written) as acceptable commands and write commands (commands where any data is modified or written) as unacceptable commands.

In some embodiments, for each request forwarded by the communications interface 602, the proxy system 605 may determine whether the request is a read type request (for example, only requesting data in the data store be accessed without modifying any data in the data store) or a write type request (for example, requesting that at least one portion of data in the data store be modified in the data store). In some embodiments, when the proxy system 605 determines that the request is the read type request, the proxy system 605 may forward the request to the data store 610 for processing, at (5). In some embodiments, when the proxy system 605 determines that the request is the read type request, the proxy system 605 may confirm that the data store 610 is in one of the active state 205 and the failover state 215 or determine the state in which the data store 610 is operating. If the data store is not in the active state 205 or the failover state 215, the proxy system 605 sends a denial of the request to the communications interface 602, at (4). If the data store is in the active state 205 or the failover state 215, the proxy system 605 forwards the analyzed request to the data store 610 for processing, at (5). In some embodiments, when the proxy system 605 sends the denial of the request to the communications interface 602, the proxy system 605 indicates a reason as to why the request was denied (for example, that the data store 610 is in the wrong state to process the request), for example with an indication of the state of the data store 610, at (4).

In some embodiments, when the proxy system 605 determines that the request is the write type request, the proxy system 605 may confirm that the data store 610 is in the active state 205 and not in either of the standby state 210 or the failover state 215. If the data store is not in the active state 205, the proxy system 605 sends a denial of the request to the communications interface 602 at (4). If the data store is in the active state 205, the proxy system 605 forwards the analyzed request to the data store 610 for processing, at (5). In some embodiments, when the proxy system 605 sends the denial of the request to the communications interface 602, the proxy system 605 indicates a reason as to why the request was denied (for example, that the data store 610 is in the wrong state to process the request).

The data store 610 processes valid requests forwarded by the proxy system 605. When the data store 610 is in the active state 205 and the received requests comprise read or write requests, the data store 610 processes the received requests and provides any output (for example, data read from the data store 610 pursuant to a read request) to the communications interface 602, at (6). In some embodiments, the data store 610 may send a confirmation of a completed request (for example, a write request) at (6) (though not shown in FIG. 6).

At (7), the communications interface 602 may transmit any denied requests, request confirmations, or read data to a requesting entity. In some embodiments, the denied requests include the reason why the request was denied, as provided by the proxy system 605. In some embodiments, the request confirmations include a confirmation from the data store 610 that the received request was completed (for example, a completed read confirmation or a completed write confirmation). In some embodiments, the communications interface 602 transmits data to the requesting entity when the received request was a request for data from the data store 610.

In some embodiments, to reduce communication latency and improve analysis times of the database requests being reviewed, the proxy system 605 and the data store 610 to which the database requests reviewed by the proxy system 605 are destined share a host (for example, are hosted by the same zone 120A, as in FIG. 6). Alternatively, the proxy system 605 and the data store 610 may belong to different zones or regions. As distances between the proxy system 605 and the data store 610 increase, so may the corresponding latency and analysis times for analyzing the requests. In some embodiments, the proxy system described herein may enforce defined states for various communication mediums, for example middleware, representational state transfer (REST), gRPC, and so forth, or for authentication and/or authorization mechanisms, such as identity and access management (IAM).

In some embodiments, the data store 610 may not have a defined state of its own. Instead, the data store 610 may have a state defined by the state of the zone or region in which the data store 610 is hosted. In some embodiments, the failover service may define states for individual data stores 610, where the data stores 610 are nodes that have defined states. In some embodiments, the proxy system may be implemented by software components, hardware components, or a combination thereof.

An example of a software implemented proxy system is provided below. The example code below provides the proxy system to enforce read-only communication (for example, read requests only) between an arbitrary application and a MySQL database. The proxy system enforces the read-only communications by inspecting each packet sent or directed to the database. The packets sent to the database can be one of any number of command types supported by the MySQL database. For example, if the proxy system determines that the packet is a COM_QUERY, the proxy system inspects the query to determine whether the query contains any standard SQL write operation (for example, INSERT, DROP, CREATE, and so forth). If the query does contain an operation that is blacklisted during the current state (for example, the fenced state), the proxy system may drop the packet instead of forwarding the packet to the data store. The proxy system also optionally responds to a source of the packet (for example, an application client) with a MySQL error packet. The proxy system creates the MySQL error packet to express failure of the packet including the write operation due to the read-only state of the cell. If the proxy system determines that the packet contains only standard SQL read operations, such as SELECT, the proxy system may forward the packet to the MySQL database with no intervention.

In the example code below, the proxy system is a TCP proxy that forwards port 8123 to 3306 (where the SQL database is running). The proxy system references a function that returns a constant value representing a fenced state for the MySQL database, though this function would be replaced with the action of polling the failover service, as described above.

```
class MySqlPacket(Packet):
    name = "MySql Packet"
    fields_desc = [
        Field("payload_length", 0, "<Hx"),
        Field("sequence_id", "", "<B")
    ]
class MySqlResponsePacket(MySqlPacket):
    name = "MySqlResponsePacket"
    fields_desc = [
        Field("header", "0", "<B")
    ]
class MySqlErr(MySqlPacket):
    name = "ERR_Packet"
    fields_desc = [
        Field("error_code", 0, "<H"),
        StrField("error_msg", "", "<p")
    ]
class MySqlCommand(MySqlPacket):
    name = "MySql Command"
    fields_desc = [
        EnumField("COM", 0, {
            0: "COM_SLEEP",
            1: "COM_QUIT",
            2: "COM_INIT_DB",
            3: "COM_QUERY",
        }, "<B"),
    ]
class MySqlQuery(MySqlCommand):
    name = "COM_QUERY"
    fields_desc = [
        StrField("query", "", "<p")
    ]
```

Constructing a custom error response, the show( ) prints the packet to stdout:

```
def construct_err(pkt: MySqlPacket, msg: str) -> bytes:
    payload = MySqlErr(error_code=1234, error_msg=msg)
    header = MySqlResponsePacket(header=0xff)
    response = MySqlPacket(payload_length=len(header) + len(payload), sequence_id=pkt.sequence_id + 1)
    response.add_payload(header)
    response.add_payload(payload)
    response.show( )
    return bytes(response)
```

The proxy system performs a mock check for cell state and validates that the query does not include any "write" operation. This is called by validate_request in the proxy (next frame), which deserializes the packet, prints it to stdout for debugging, and checks if the packet is a query:

```
WRITE_OPERATIONS = ['insert', 'create', 'drop']
def _handle_query(query: MySqlQuery):
    my_cell_state = get_cell_state('TEST')
    if MeridianCellState.OFFLINE == my_cell_state:
        return True, _construct_err(query, "Cannot write to offline database")
    elif MeridianCellState.FENCED == my_cell_state and any(op in str(query.query).lower( ) for op in WRITE_OPERATIONS):
        return True, _construct_err(query, "Cannot write to fenced database")
    else:
        print("Allowing :", query.query)
        return False, query
```

Forwarding proxy (Twisted API implementation) that validates the packets:

```
def dataReceived(self, data):
    is_err, err_pkt = validate_request(data)
    if not is_err:
        self.peer.transport.write(data)
    else:
        print("Responding with err", err_pkt)
        self.transport.write(err_pkt)
```

Execute the following statement to create a new table against port 8123 (where the proxy system is):

mysql -h 127.0.0.1 -P 8123 -u root -p -e "CREATE TABLE IF NOT EXISTS tasks (task_id INT AUTO_INCREMENT, title VARCHAR(255) NOT NULL, start_date DATE, due_date DATE, priority TINYINT NOT NULL DEFAULT 3, description TEXT, PRIMARY KEY (task_id));"

Which results in the following protocol transaction:

Starting with the login handshake-note the password is opaque, also that MariaDb, a MySql derivative, is used, but the protocol is the same.

```
###[ MySql Packet ]###
    payload_length= 110
    sequence_id= 0
###[ MySql Command ]###
    COM = 10
###[ Raw ]###
    load = '5.5.5-10.4.8-MariaDB-1:10.4.8+maria~bionic\x00H\x00\x00\x00Q\\\\8B%/Z\x00\xfe\xf7\x08\x02\x00\xff\x81\x15\x00\x00\x00\x00\x00\x00\x07\x00\x00\x00Z58[?jx;`G)7\x00mysql_native_password\x00'
###[ MySql Packet ]###
    payload_length= 182
    sequence_id= 1
###[ Raw ]###
    load = '\x85\xa2\xbf\x01\x00\x00\x00\x01!\x00\x00\x00\x00\x00\x00\x00\x00\x00\x00\x00\x00\x00\x00\x00\x00\x00\x00\x00\x00\x00\x00\x00\x00root\x00\x14\xe4\x06\xe3K\xc6\x99\x81\x04zr\xe9\x90\x13IB\x7f\xdb@\x05Xmysql_native_password\x00e\x03_os\x05Linux\x0c_client_name\x08libmysql\x04_pid\x043608\x0f_client_version\x065.7.27\t_platform\x06x86_64\x0cprogram_name\x05mysql'
###[ MySql Packet ]###
    payload_length= 7
    sequence_id= 2
###[ Raw ]###
    load = '\x00\x00\x00\x02\x00\x00\x00'
```

Note here that the client executes a select statement before the create, the "Allowing: x" is just debug output saying this query can be forwarded

```
###[ MySql Packet ]###
    payload_length= 33
    sequence_id= 0
###[ MySql Command ]###
    COM = COM_QUERY
###[ COM_QUERY ]###
        query = 'select @@version_comment limit 1'
Allowing : b'select @@version_comment limit 1'
###[ MySql Packet ]###
    payload_length= 1
    sequence_id= 1
###[ Raw ]###
        load =
    "\x01'\x00\x00\x02\x03def\x00\x00\x00\x11@@version_comment\
    x00\x0c!\x00]
    \x00\x00\x00\xfd\x00\x00'\x00\x00\x00\x00\x03\x1fmariadb.org
    binary distribution\x07\x00\x00\x04\xfe\x00\x00\x02\x00\x00\x00"
```

Here, the client finally executes the create statement, since the 'insert', 'create', 'drop' commands are blacklisted, this should fail.

```
###[ MySql Packet ]###
    payload_length= 231
    sequence_id= 0
###[ MySql Command ]###
    COM = COM_QUERY
###[ COM QUERY ]###
        query = 'CREATE TABLE IF NOT EXISTS tasks (
        task_id INT AUTO_INCREMENT, title VARCHAR(255) NOT
        NULL, start_date DATE, due_date DATE, priority TINYINT
        NOT NULL DEFAULT 3, description TEXT, PRIMARY KEY
        (task_id)
)'
```

The proxy system intercepts this and responds with a custom error packet and does not forward the COM_QUERY to the database server:

```
###[ MySql Packet ]###
    payload_length= 34
    sequence_id= 1
###[ MySqlResponsePacket ]###
    header = 255
###[ ERR Packet ]###
    error_code= 1234
    error_msg = 'Cannot write to fenced database'
Responding with err b'"\x00\x00\x01\xff\xd2\x04Cannot write to fenced
database'
```

The client responds to the proxy saying it would like to quit this interaction due to the error

```
                ###[ MySql Packet ]###
                    payload_length= 1
                    sequence_id= 0
                ###[ MySql Command ]###
                    COM = COM_QUIT
```

The MySql command line client then processes the error and prints the following:
ERROR 1234 (HY000) at line 1: Cannot write to fenced database Example Interactions for Coordinated States among Multi-Region Architectures As described above, the application cell that has entered a fenced state should serve read requests, but not write requests. Coordinating transition to and operation in this state is important to prevent split-brain scenarios, as described above. One challenge may be coordinating enforcement of read-only status for application's data stores.

An example of how the customer might apply the fenced state is during the event of a failover from one region or zone to another region or zone. The customer may shift their workload from the zone 120A to the zone 120B due to some degradation in their infrastructure in zone 120A. Although zone 120A is compromised, the customer may set their zone 120A cell to the fenced state 215, allowing the zone 120A cell to continue to serve read requests while operations and/or capacity is scaled up in the zone 120B and traffic shifted from the zone 120A to the zone 120B. Thus, the zone 120A cell is allowed to provide continued, partial responsiveness to read requests for the customer's applications 305. Coordinated fencing (for example, coordinating operations when one application cell is in the fenced state 215) ensures that writes are no longer processed past a coordinated point in time by the zone 120A, allowing for the workload to be processed in the zone 120B without concern for the split-brain scenario.

The failover service 302 allows customers to set the cell state for one or more cells of the application 305 through a 100% available failover service data plane (also referred to herein as "data plane"). In some embodiments, the data plane enforces write consistency through usage of one or more applications for coordinated state. In some embodiments, the applications for coordinated state may be able to operate across multiple regions. In some embodiments, the customers are provided with a number of endpoints (for example, five (5) endpoints) through which the customers can access the data plane with the assurance that at least a subset of the number of endpoints (for example, at least three (3) of the five (5) endpoints) will be available and responsive at any given time, regardless of any regional outages or otherwise. The endpoints generally include the same information, as changes to state information in one endpoint may be propagated to each of the other endpoints. For the customer to transition one of its application cells into the fenced state 215, the customer may make an API, console, or SDK call against any number of the endpoints. The failover service data plane may reconcile these requests via a quorum (for example, ensuring that at least a majority of the endpoints have the same information), propagate the newly decided state to all data plane hosts, and make the newly decided state available for being read by failover service clients with the understanding that customer applications 305 will act upon the fenced state 215. Additional details are provided below.

As described herein, the cells learn of the states they are in by polling the failover service 302 and, thus, know what operations the cell is allowed to perform. Thus, cells in the active state 205 know that they can perform all operations, cells in the standby state 210 know that they cannot perform any operations, and cells in the fenced state 215 know that they can perform some operations (for example, read operations). In some embodiments, if the cell is unable to poll the failover service 302 or does not receive a response to a poll, then the cell may default to the standby state 210 or the fenced state 215. The customers may implement logic to respect and allow/prevent some operations into their applications based on the polled states of the application cells.

The failover service 302 may instruct the routing service and/or the traffic management service to consider an endpoint associated with a host in the active or fenced states as an endpoint healthy to send traffic. On the other hand, if the cell is in the standby state, the failover service 302 may instruct the routing service and/or the traffic management service to consider the corresponding endpoint healthy and prevent any traffic from reaching that endpoint. However, considering delays caused by health checks for the routing service running for each cell and DNS time to live value (TTLs), traffic flow won't be switched instantaneously simply due to the healthiness of the corresponding endpoints. As such, the customer may include in the application 305 logic to interpret cell states to assist in coordinating communications when states change.

Figure 7:
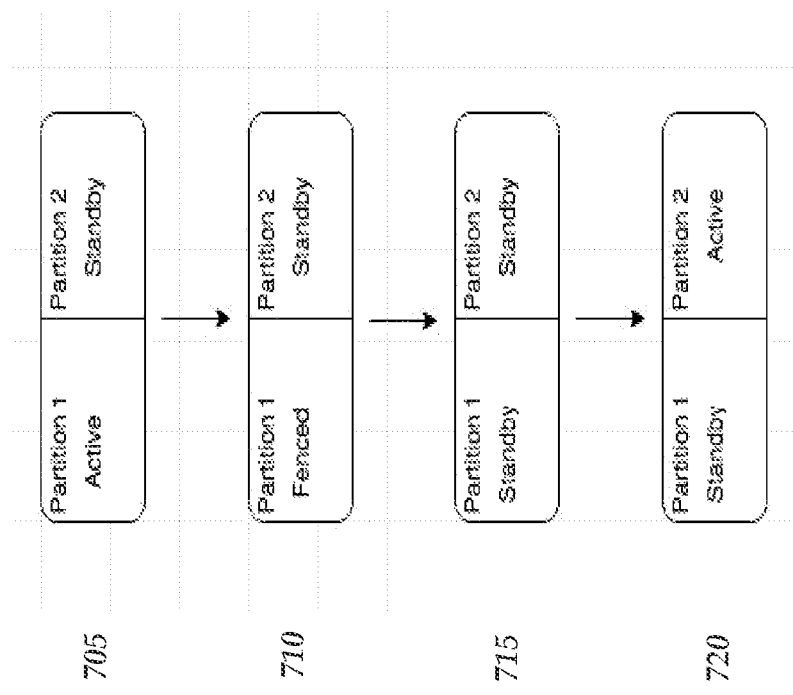
FIG. 7 shows one potential course of state transitions that the customer may implement in their applications.

In some embodiments, the customer may introduce logic into the application 305 that controls, at least in part, state transitions. For example, at a first time point, a first partition of the application 305 may start in the active state 205 and a second partition of the application 305 may start in the standby state 210. The logic in the application 305 may control to or between which states the partitions may transition directly. FIG. 7 shows one potential course of state transitions that the customer may implement in their applications. For example, from the first time point 705, the first partition may transition to the fenced state 215 and the second partition may maintain the standby state 210 at a second time point 710. From the second time point 710, the first partition may transition to the standby state 210 and the second partition may maintain the standby state 210 at a third time point 715. From the third time point 715, the first partition may maintain to the standby state 210 and the second partition may transition to the active state 205 at a fourth time point 720. In some embodiments, the customer may introduce another, optional, state between the third time point 715 and the fourth time point 720, where the first partition maintains the standby state 210 and the second partition transitions to the fenced state 215 before transitioning to the states shown at the fourth time 720.

In some embodiments, the customer may create a failover service stack using a failover service control plane API (or similar service) and will be provided with data plane endpoints to use to check status of the application cells, as described herein. As part of stack creation, the customer may define a minimum state change interval for their application. In some embodiments, the minimum state change interval is a value that controls how quickly application cells can transition from one state to another state (for example, an amount of time that must pass between state changes). Such a value may prevent any application cells from switching states too quickly after another state change, which could result in more than one partition being in the active state 205 at the same time.

The customer may use will have recovery time objective (RTO) and recovery point objective (RPO) targets. After the application cell changes states, the application may be programmed to monitor metrics of the partitions changing state (for example, data replication lag, and so forth) for a period of time to verify that the state change was successful. Once the successful state change is verified, the application 305 may decide whether to transition the application cells to a different state. The customer may determine how quickly application cells will change from a current state to a new state after transitioning to the current state. In some embodiments, if the customer does not wish to include logic in the application 305 to perform such state change validations, the customer can program a lowest allowed minimum state change interval of 2y seconds (where y is a cache duration on the data plane servers). In some embodiments, the lowest allowed minimum state change interval may be customer definable or dynamic.

In some embodiments, each host (for example, node) of a given partition creates an instance of a failover service client. This client may be responsible for interacting with the data plane endpoints to get status and/or properties for a given partition, cell, or host of the application 305. Accordingly, whenever any component running on the host wants to check the state of the component, the component will call the failover service client. The failover service client may check whether there is some state information present in the memory cache of the failover service client. If so, then the failover service client may reply back with that state without making any call to the failover service data plane server. If not, then the failover service client may query the failover service data plane server to learn about the state of the partition. In some embodiments, the response from the failover service data plane server to the query response by the failover service client may contain the queried value (for example, the state) along with an additional field including a lease duration. The lease duration may specify a period of time, time, or date during which the application 305 may cache and use the received state value. Once the period of time lease duration expires (for example, the period of time ends or the time or date passes) the application 305 may discard the state value and request an updated value from the failover service data plane server. In some embodiments, each host of the application 305 polls the failover service 302 for updated state for the host without using a specific failover service client.

In some embodiments, the failover service data plane server that receives the read request from the application 305 may set the lease duration based on when the local cache of the failover service data plane server is set to expire. In some embodiment, an established lease duration may ignore call delays and/or clock skews between devices. If the failover service client is not able to reach a designated endpoint, then the failover service client may poll any of the other data plane endpoints. If the failover service client is not able to reach any of the end points, then the failover service client may provide a default reply to the application 305 of the standby state 210. Alternatively, if the data plane endpoints are unable to generate a quorum for the state information of the requesting application cell, then the failover service client may provide a default reply to the application 305 of the standby state 210. In some embodiments, the lease duration details for the state information may be provided directly to the application 305 without the failover service client interface. Similarly, in some embodiments, the application cell polls the endpoint(s) without use of the failover service client to identify the state of the application cell.

The customer may realize that the application 305 is experiencing a disaster scenario and that the application 305 is in need of performing a failover. In some embodiments, the interface provides visibility metrics for the application 305 and the host for the application 305.

In some embodiments, the customer may monitor the metrics (for example, via an operator), along with any other metrics regarding application health, data replication lag, and so forth, to decide whether failover is safe to perform.

The application 305 may call the failover service data plane endpoints to identify any change in the state of a host experiencing the disaster scenario. The failover service data plane may check if there has been any state change made in a previous number of time units (for example, corresponding to the minimum state change interval described above). If so, then the failover service data plane may notify the customer that the state change cannot yet be completed due to the previous state change being within the minimum state change interval. If not, then the failover service data plane may update the state of the partition and confirm the update to the customer.

Whenever an application host may need state information to perform an operation, the application host may check with the failover service client, which will look the state information up in its memory cache or will contact the fail over service data plane server, as described above. As soon as the lease duration expires, the failover service server may notify the failover service client that the state has been transitioned to a new value and the application host may then start operating in its new state. In some embodiments, since the maximum cache duration on the failover server data plan server is y sec, all application hosts may work on a newly set state within 2y seconds.

Figure 8:
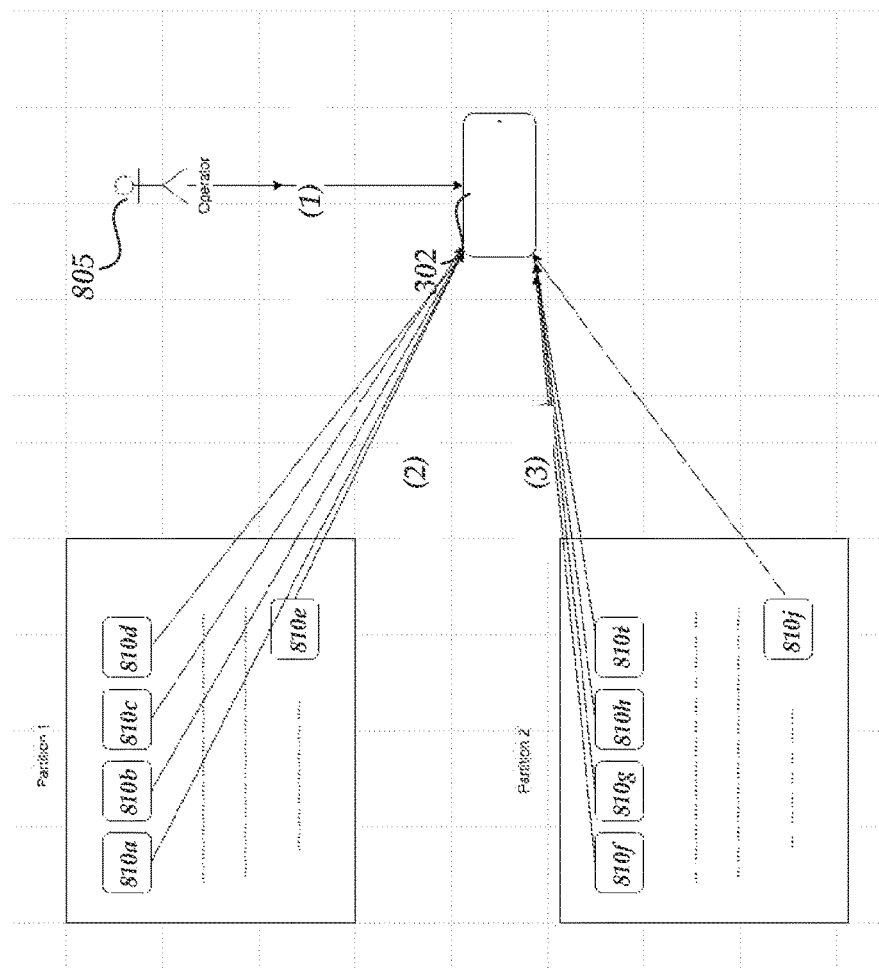
FIG. 8 shows an example workflow of hosts polling the network-based services of FIG. 1.

An example of the host polling for partitions is shown in FIG. 8. FIG. 8 shows, at (1), an operator (for example, the customer) 805 that sends a communication to, for example, a first instance of the network-based services 110. The communication may include a name or identifier of the application 305 for which the operator 805 is providing updated state status, a partition name or identifier for the partition of the application 305 having the state updated, and the new state for the identified partition. As shown in FIG. 8, the new state information is sent to the failover service 302 (for example, a data plane of the failover service 302. In some embodiments, the failover service 302 as shown may represent a computing system for the failover service 302 (for example, a cell for the failover service 302). In some embodiments, the computing system may comprise an endpoint 125 of the failover service 302.

As described herein, the hosts (for example, individual nodes, computing components, and so forth that host an instance of the application 305) 810a-j may poll the failover service 302 to identify the states for the partitions associated with the respective hosts. As such, at (2), each of the hosts of the first partition will send a polling request to the failover service 302 that include the name of the application 305 with which the host is associated and an identifier identifying the first partition as the partition to which the host belongs. Similarly, at (3), each of the hosts of the second partition will send a polling request to the failover service 302 that include the name of the application 305 with which the host is associated and an identifier identifying the second partition as the partition to which the host belongs. In response to the polling, the failover service 302 may communicate a first value indicating of the state of the first host. As such, each host will receive a value corresponding to its state, as determined by the failover service 302 (for example, as stored in the storages 304 of the failover service). In some embodiments, the failover service 302 may control the values communicated to ensure that only one host is given the active state 205. In some embodiments, the failover service 302 may allow multiple hosts to operate in the active state 205. In such embodiments, the customer may need to identify one or more parameters that the failover service 302 uses to route traffic to the appropriate host or to identify which host is the master, etc., for purposes of ensure proper routing of requests and maintaining data integrity. Though not shown in FIG. 8, the failover service 302 may respond to each of the hosts identifying the status of the host's respective partition as stored in the storage 304 of the failover service 302.

As described herein, when the hosts receive their state values from the failover service 302, they may update their states if they need to change to a different state or maintain their states if the received state value is the same as the existing state for the host. In some embodiments, the responses to the polling by hosts may include state change time intervals that control how quickly hosts can change state and/or indications of a sequence of states through which the host transitions to arrive at the state indicated by the received state value. In some embodiments, the host may evaluate the state change time interval along with other metrics for the host before changing states. In some embodiments, the response to the polling includes a lease duration for the state value. The lease duration may indicate to the host how long before the received state value expires, as described above. When the lease duration expires, the host may poll the failover service 302 for its updated state value. In some embodiments, the polling to the failover service 302 by the hosts may be directed to one or more endpoints of the failover service 302.

Validating Proposal

Initially, all hosts (for example, nodes) in the first partition may be in the active state 205 and all hosts in the second partition are in the standby state 210. At a first time t=0, the customer may decide to switch the first partition to the fenced state. By the time t=2y, all noes in the first partition would have received indication of the change of state to and changed state to the fenced state 215. In some embodiments, some of the hosts change state earlier, but regardless all will change state to the fenced state 215 within 2y time units, so by t=2y. At t=x, the customer may be able to change the state of the hosts in the first partition again will be eligible to change state again. Since x>=2y, by t=x, all hosts of the first partition should be in the updated state. Any state change attempted before that time may be rejected by the failover service. At time t=z, the customer may instruct to set the first partition to standby and by time t=z+2y, all hosts in the first partition may change state to the standby state. At the time t=z+2y, the hosts in the first partition may still be receiving some traffic but might not process the traffic if the customer includes logic in the application 305 to not do anything if the host is in the standby state 210. By the time t=z+x, the customer may be eligible to perform a next state change. At the time t=u, the customer may decide to the second partition active and by the time t=u+2y, all hosts in the second partition may be in the active state 205. The hosts in the second partition might not be receiving traffic yet, as the routing service and/or the traffic management service may be delayed in routing traffic (for example, due to health checks and/or DNS TTLs). However, these hosts will be ready for the traffic when it does arrive.

In the scenario described, at no point of time can there be a case when one or more of the hosts in the first partition and one or more hosts of the second partition are both in the active state 205. At any point of time, if any host goes bad (for example, is unable to make calls to the failover service data plan server due to any issue), then the host will consider itself to be in the standby state 210 and, therefore, even if it is receiving traffic, may not process the traffic. For example, if the hosts of the first partition were changed from the active state 205 to the fenced state 215 but one of the first partition hosts was unable to contact the failover service client to identify the new state, the one of the first partition hosts may default to the standby state 210 instead of staying in the active state 205.

Read Call Agreement

In some embodiments, whenever failover service endpoint receives a read call, the failover service endpoint replies back with the response as well as the lease duration for the state information in the response, as discussed above. The customer may reuse/cache the returned state value until the lease duration expires. However, after the lease expires, the customer should make a new call to the failover service to receive an updated state. In some embodiments, the failover service may not provide read after write consistency information. For example, the response provided by the failover service for any read call may or may not contain information regarding the writes made within the past y seconds, where y is the cache time on the failover service data plane server.

Write Call Agreement

In some embodiments, when the failover service endpoint receives a write call, the failover service endpoint will perform one or validation procedures and then only commit a write operation. They customer may receive a confirmation that the write operation was successful. Any traffic flip, if expected after the state change, may be expected to happen eventually after some time based on the DNS TTL expiry. However, the failover service may start communicating new states so that the customer host can act accordingly. In some embodiments, the customer is expected to pass a request timestamp in UTC as part of the request parameters. If the request timestamp is in the future, or it is earlier than the biggest timestamp seen by any failover service endpoint thus far, then the failover service endpoint server might not process the request and may simply reply back with an OutOfOrderRequestException.

If there are multiple simultaneous write calls made to the failover service, then the failover service endpoint server may use the failover service client supplied request timestamp to decide which request is older. If multiple requests have the same timestamp, then among these requests, whichever request reached the failover service endpoint server first will be considered as older request. The commits may be applied from older request to newer request in a sequential fashion.

Write Call Behavior

In some embodiments, an operator will call with failover service data plane to change a state of an application cell. Various options may exist for the write call interactions between the application and the failover service 302.

For example, in a first option, when the customer is calling a control plane or similar API, the customer may use the API to register the failover service 302 to perform a task such as a write operation. The customer can check at any later point in time whether the task failed or succeeded. Similarly, when the customer calls a failover service data plane or similar API, the failover service data plane can reply with an identifier acknowledging that the write operation (for example, the requested state change) was registered successfully in the failover service servers. The failover service data plane may work on performing the registered task and the customer can use the identifier to query a status of the registered task at a later time. In some embodiments, the status may comprise one or more of "in queue", "write successful", "validation error", and so forth. In some embodiments, a successful write call response means that the write operation has been successfully registered for future processing.

In a second operation, the customer can call the failover service data plane API for a write operation. The call may accept the write operation and return a success response. After a period of time, when the failover service 302 attempts to sync changes between endpoints 125, the failover service may detect conflicts between write operations requests and so forth and may attempt to resolve the conflicts. In some embodiments, the customer may not receive any explicit update because the previously committed write call is rejected during conflict resolution. For example, if one endpoint 125 receives a call to set a partition 1 to active and a second 2nd endpoint got call to delete the partition 1, then both customers will receive an initial success response to their respective calls for the write operation, but in the backend, one of the write operations may be silently rejected due to data validations. As such, a successful write call may comprise a write call that the failover service 302 accepted but if needed might be discarded to bring the failover service into a stable state.

In a third option, the customer may call the failover service data plane API for the write operation. The call may only return a success response if the failover service 302 committed the request. As such, the failover service guarantees that after returning 200 OK for the write call, the failover service may not discover any data validation issues or conflicts in the failover service that might force the failover service to silently discard the write operation. Hence, the successful write call may means that the failover service has actually performed the write operation after ensuring there are no validation errors or conflicting writes.

Based on these options, Option 3 may provide the more convenient interaction between the customer and the failover service 302 as opposed to providing tokens for write operation registry. A next preferred alternate may be Option 1, because under Option 1 the customer may be in sync with the failover control plane API. A last option may be Option 2 because the customer may get least amount of visibility regarding which writes are succeeding due to the potential for a confirmed write to be discarded during a conflict resolution.

Example Computer System

Figure 9:
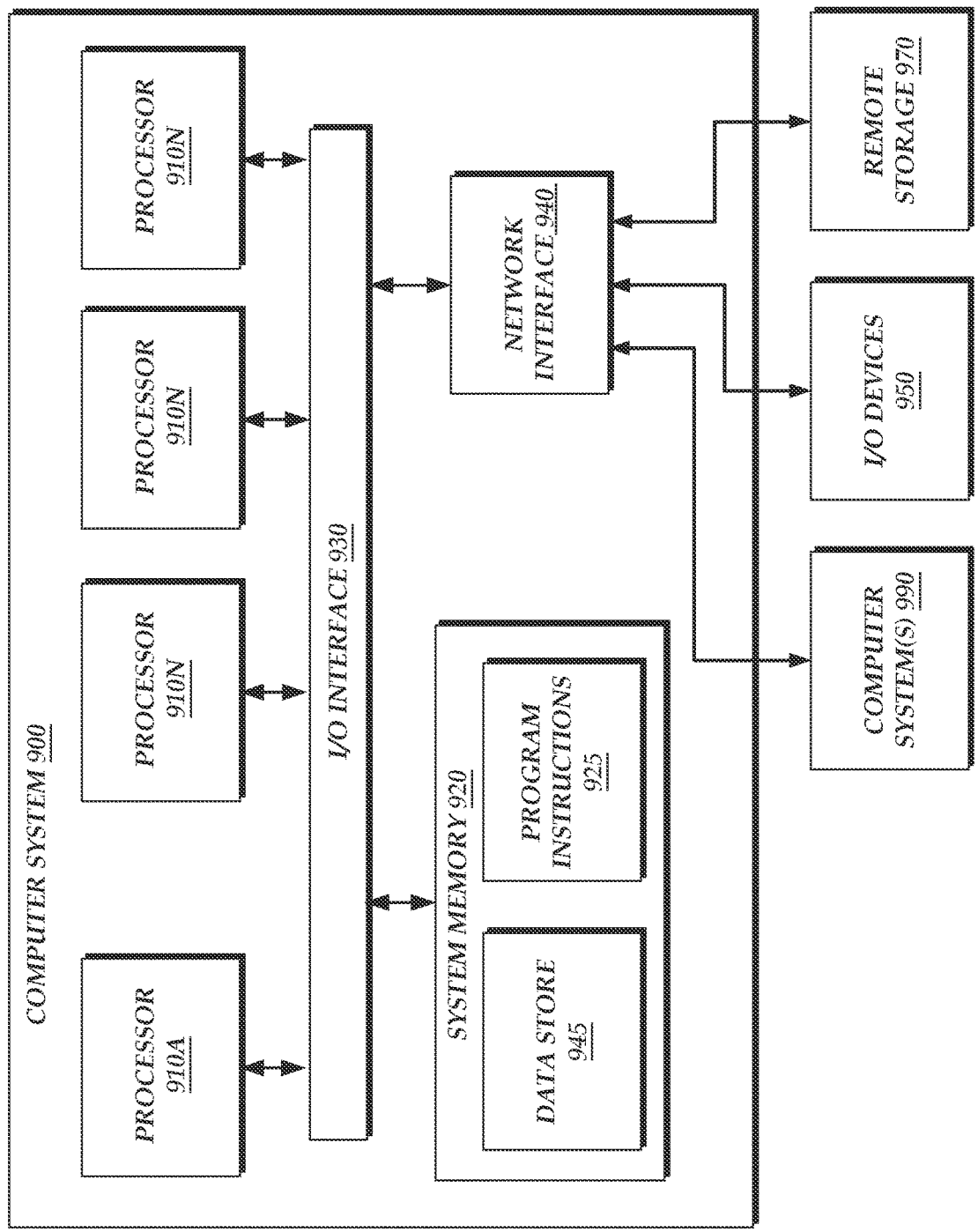
FIG. 9 depicts a schematic diagram of an example computing system.

FIG. 9 is a block diagram illustrating an example computer system, according to various embodiments. For example, instances of the computer system 900 may be configured to interact with the application 305 described herein, implement host devices in the failover service 302, implement host devices in the application 305, implement computing systems or devices described herein (for example, the client devices 102), and so forth. Computer system 900 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 900 includes one or more processors 910 (any of which may include multiple cores, which may be single or multi-threaded) coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86,PowerPC, SPARC, or MIPS ISAs, or any other suitable ISA. In multiprocessor systems, each of processors 910 may commonly, but not necessarily, implement the same ISA. The computer system 900 also includes one or more network communication devices (e.g., network interface 940) for communicating with other systems and/or components over a communications network (e.g. Internet, LAN, etc.).

In the illustrated embodiment, computer system 900 also includes one or more persistent storage devices 960 and/or one or more I/O devices 980. In various embodiments, persistent storage devices 960 may correspond to disk drives, tape drives, solid state memory, other mass storage devices, block-based storage devices, or any other persistent storage device. Computer system 900 (or a distributed application or operating system operating thereon) may store instructions and/or data in persistent storage devices 960, as desired, and may retrieve the stored instruction and/or data as needed. For example, in some embodiments, computer system 900 may act as a worker, and persistent storage 960 may include the SSDs attached to that worker to facilitate storage of write journal entries.

Computer system 900 includes one or more system memories 920 that are configured to store instructions and data accessible by processor(s) 910. In various embodiments, system memories 920 may be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 920 may contain program instructions 925 that are executable by processor(s) 910 to implement the routines, interactions, and techniques described herein. In various embodiments, program instructions 925 may be encoded in platform native binary, any interpreted language such as Java byte-code, or in any other language such as C/C++, Java, etc., or in any combination thereof. For example, in the illustrated embodiment, program instructions 925 may include program instructions executable to implement the functionality of any software, modules, components, etc., described herein. In some embodiments, program instructions 925 may implement a device of the application 305, the failover service 302, or other elements of a zone 120, a region 112, or the system 110.

In some embodiments, program instructions 925 may include instructions executable to implement an operating system (not shown), which may be any of various operating systems, such as UNIX, LINUX, Solaris, MacOS, Windows, etc. Any or all of program instructions 925 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 900 via I/O interface 930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 940.

In some embodiments, system memory 920 may include data store 945. In general, system memory 920 (e.g., data store 945 within system memory 920), persistent storage 960, and/or remote storage 970 may store data, data blocks, instructions, metadata associated with data, and/or state data or information, configuration information, and/or any other information usable in implementing the methods and techniques described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as other computer systems 990, for example. In addition, network interface 940 may be configured to allow communication between computer system 900 and various I/O devices 950 and/or remote storage 970 (which may represent, for example, storages 304 and/or 307 or data store 610). Input/output devices 950 may, in some embodiments, include one or more display terminals, keyboards, keypads, touchpads, scanning devices, voice or optical recognition devices, or any other devices suitable for entering or retrieving data by one or more computer systems 900. Multiple input/output devices 950 may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol. In various embodiments, computer system 900 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud or network-based computing system 110 whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the Clauses are to be embraced within their scope.

What is claimed is:

1. A computing system comprising:
    a computer-readable memory storing executable instructions; and
    one or more computer processors in communication with the computer-readable memory, wherein the one or more computer processors are configured to execute the executable instructions to receive configuration information comprising:
        identifiers for individual cells of a plurality of cells of an application distributed across a plurality of zones, the plurality of cells including at least a primary cell and a secondary cell,
        a defined state for individual cells of the plurality of cells,
        one or more dependencies for the application, and
        a failover workflow defining actions to take in a failover event based on the defined state for individual cells and the one or more dependencies;
    wherein the one or more computer processors are further configured to execute the executable instructions to at least:
        receive a request to initiate the failover event, and
        update the states for corresponding cells of the plurality of cells based on the failover workflow.

2. The computing system of claim 1, wherein the one or more computer processors are further configured to execute the executable instructions to:
    identify that the primary cell changes state to a fenced state; and
    route at least a portion of read traffic to the primary cell for at least a duration of time after the primary cell changes state to the fenced state.

3. The computing system of claim 2, wherein to identify that the primary cell changes state to the fenced state, the one or more computer processors are further configured to execute the executable instructions to identify that at least a quorum of data store partitions across the plurality of zones indicates that a current state value of the primary cell is not an active state.

4. The computing system of claim 2, wherein to route the at least a portion of read traffic to the primary cell for at least a duration of time after the primary cell changes state to the fenced state, the one or more computer processors are further configured to execute the executable instructions to provide routing instructions to at least one of a traffic management service or a Domain Name System (DNS) service provider.

5. The computing system of claim 1, wherein the configuration information defines the primary cell to have an active state and the secondary cell to have a standby state.

6. The computing system of claim 5, wherein to update the states for corresponding cells of the plurality of cells based on the failover workflow, the one or more computer processors are further configured to execute the executable instructions to update the primary cell to have a fenced state and update the secondary cell to have the active state.

7. The computing system of claim 1, wherein the one or more computer processors are further configured to execute the executable instructions to propagate the configuration information to a plurality of data stores distributed across the plurality of zones.

8. The computing system of claim 1, wherein the one or more computer processors are further configured to execute the executable instructions to propagate updates to the states for the corresponding cells of the plurality of cells to data stores of other computing systems hosted in at least one different zone from the computing system, and wherein the propagation of the updates to the states for the corresponding cells enables the computing system and the other computing systems to provide a highly available service for managing the states of the corresponding cells.

9. The computing system of claim 8, wherein the one or more computer processors are further configured to execute the executable instructions to identify a current state value for one of the primary cell or the secondary cell based on at least a quorum of the data stores, wherein the quorum of the data stores provides highly consistent data.

10. A method comprising:
receiving configuration information for an application, the configuration information comprising:
identifiers for individual cells of a plurality of cells of the application distributed across a plurality of zones, the plurality of cells including at least a primary cell and a secondary cell,
a defined state for individual cells of the plurality of cells,
one or more dependencies for the application, and
a failover workflow defining actions to take in a failover event based on the defined state for individual cells and based on the one or more dependencies;
receiving a request to initiate the failover event; and
updating the one or more dependencies for the application based on the failover workflow.

11. The method of claim 10, wherein the configuration information defines the primary cell to have an active state and the secondary cell to have a standby state and wherein the failover workflow updates the primary cell to have a fenced state and updates the secondary cell to have the active state.

12. The method of claim 10 further comprising propagating the configuration information to a plurality of data stores distributed across the plurality of zones.

13. The method of claim 10, wherein updating the one or more dependencies comprises updating traffic routing for the application between the primary cell and the secondary cell.

14. The method of claim 10 further comprising:
identifying that the primary cell changes state to a fenced state; and
routing at least a portion of read traffic to the primary cell for at least a duration of time after the primary cell changes state to the fenced state.

15. The method of claim 14, wherein identifying that the primary cell changes state to the fenced state comprises identifying that at least a quorum of data store partitions across the plurality of zones indicates that a current state value of the primary cell is not an active state.

16. The method of claim 14, wherein routing the at least a portion of read traffic to the primary cell for at least a duration of time after the primary cell changes state to the fenced state comprises routing instructions to at least one of a traffic management service or a Domain Name System (DNS) service provider.

17. A computing system comprising:
a computer-readable memory storing executable instructions; and
one or more computer processors in communication with the computer-readable memory, wherein the one or more computer processors are configured to execute the executable instructions to receive configuration information comprising:
identifiers for individual nodes of a plurality of nodes of a distributed application, the plurality of nodes including a primary node and at least one secondary node in individual zones of the distributed application, and
a defined state for individual nodes of the plurality of nodes, wherein individual nodes of the plurality of nodes are set to one of a number of states comprising an active state, in which the node processes read and write requests, a passive state, in which the node does not process read or write requests, and a fenced state, in which the node processes read requests but does not process write requests;
wherein the one or more computer processors are further configured to execute the executable instructions to:
identify that a primary node changes state from the active state, wherein the primary node changing state from the active state triggers a failover, and
perform one or more actions of a failover workflow when the failover is triggered, the one or more actions comprising transitioning a first of the at least one secondary node from the passive state to the active state based on the failover workflow.

18. The computing system of claim 17, wherein the one or more actions further comprise storing a current state value of the first of the at least one secondary node as the active state in storages of a subset of the plurality of zones.

19. The computing system of claim 18, wherein the one or more actions further comprise routing read traffic and write traffic to the first of the at least one secondary node transitioned to the active state.

20. The computing system of claim 17, wherein the failover workflow defines one or more rules, including a rule that defines that only one node can operate in the active state at any one moment of time.

* * * * *